US012592829B2

(12) United States Patent
Wang et al.

(10) Patent No.: US 12,592,829 B2
(45) Date of Patent: Mar. 31, 2026

(54) ACCESS CONTROL METHOD BASED ON ZERO-TRUST SECURITY, DEVICE, AND STORAGE MEDIUM

(71) Applicant: TENCENT CLOUD COMPUTING (BEIJING) CO., LTD, Beijing (CN)

(72) Inventors: Lianying Wang, Beijing (CN); Chuanda Ding, Beijing (CN); Yang Yu, Beijing (CN)

(73) Assignee: TENCENT CLOUD COMPUTING (BEIJING) CO., LTD, Beijing (CN)

( * ) Notice: Subject to any disclaimer, the term of this patent is extended or adjusted under 35 U.S.C. 154(b) by 318 days.

(21) Appl. No.: 18/123,690

(22) Filed: Mar. 20, 2023

(65) Prior Publication Data

US 2023/0224167 A1 Jul. 13, 2023

Related U.S. Application Data

(63) Continuation of application No. PCT/CN2021/108408, filed on Jul. 26, 2021.

(30) Foreign Application Priority Data

Jun. 15, 2021 (CN) .......................... 202110660863.1

(51) Int. Cl.
| | |
|---|---|
| *H04L 9/32* | (2006.01) |
| *H04L 9/08* | (2006.01) |
| *H04L 9/40* | (2022.01) |

(52) U.S. Cl.
CPC .......... *H04L 9/3247* (2013.01); *H04L 9/0825* (2013.01); *H04L 9/0897* (2013.01); *H04L 9/3271* (2013.01); *H04L 63/0823* (2013.01)

(58) Field of Classification Search
CPC .... H04L 9/0825; H04L 9/0897; H04L 9/3271
See application file for complete search history.

(56) References Cited

U.S. PATENT DOCUMENTS

| | | | |
|---|---|---|---|
| 8,941,469 B1 | 1/2015 | Diorio et al. | |
| 10,404,476 B1* | 9/2019 | Jackson | .............. H04L 63/0428 |

(Continued)

FOREIGN PATENT DOCUMENTS

| | | |
|---|---|---|
| CN | 1477810 A | 2/2004 |
| CN | 103020825 A | 4/2013 |

(Continued)

OTHER PUBLICATIONS

International Search Report in PCT/CN2021/108408, mailed Mar. 15, 2021, 5 pages.

(Continued)

*Primary Examiner* — David J Pearson
(74) *Attorney, Agent, or Firm* — ArentFox Schiff LLP

(57) ABSTRACT

In an access control method, a service access request of a service application is received. The service access request includes identity information of a user. An identity validation request is sent to a server. The identity validation request includes the identity information of the user. Challenge information is received from the server based on the identity information of the user in the identity validation request being determined to be valid. Signature information of the challenge information is generated based on the challenge information and a private key. The signature (Continued)

information is sent to the server. A signature valid message is received from the server based on the challenge information being obtained from the signature information with a public key associated with the identity information of the user. Based on the signature valid message, the service access request is sent to the server.

20 Claims, 11 Drawing Sheets

(56)                    References Cited

U.S. PATENT DOCUMENTS

| | | | | |
|---|---|---|---|---|
| 2011/0067095 A1* | 3/2011 | Leicher | ................... | H04L 63/12 |
| | | | | 726/10 |
| 2016/0105290 A1* | 4/2016 | Khalil | ................ | H04L 63/0815 |
| | | | | 713/168 |
| 2018/0295137 A1* | 10/2018 | Zager | .................. | H04L 63/0861 |
| 2019/0075102 A1* | 3/2019 | Kim | ...................... | H04L 9/3247 |
| 2020/0076624 A1* | 3/2020 | Cambou | ............... | H04L 9/0643 |
| 2020/0104841 A1* | 4/2020 | Osborn | ................ | H04L 9/0631 |
| 2021/0194703 A1* | 6/2021 | Queralt | .............. | H04L 63/0815 |
| 2021/0385216 A1* | 12/2021 | Khalil | ...................... | H04L 9/50 |
| 2021/0390533 A1* | 12/2021 | Fan | .................... | G06Q 20/3825 |
| 2022/0360448 A1* | 11/2022 | Sahni | .................. | H04L 63/0846 |
| 2023/0205863 A1* | 6/2023 | Matsubayashi | .......... | H04L 9/32 |
| | | | | 726/19 |

FOREIGN PATENT DOCUMENTS

| | | | |
|---|---|---|---|
| CN | 104468532 A | 3/2015 |
| CN | 104641375 A | 5/2015 |
| CN | 105101194 A | 11/2015 |
| CN | 105847247 A | 8/2016 |
| CN | 106487511 A | 3/2017 |
| CN | 107872438 A | 4/2018 |
| CN | 107959573 A | 4/2018 |
| CN | 108881310 A | 11/2018 |
| CN | 110535856 A | 12/2019 |
| WO | 2021004055 A1 | 1/2021 |

OTHER PUBLICATIONS

Office Action in CN202110660863.1, mailed Oct. 18, 2022, 10 pages.
Written Opinion in PCT/CN2021/108408, mailed Mar. 15, 2022, 5 pages.

* cited by examiner

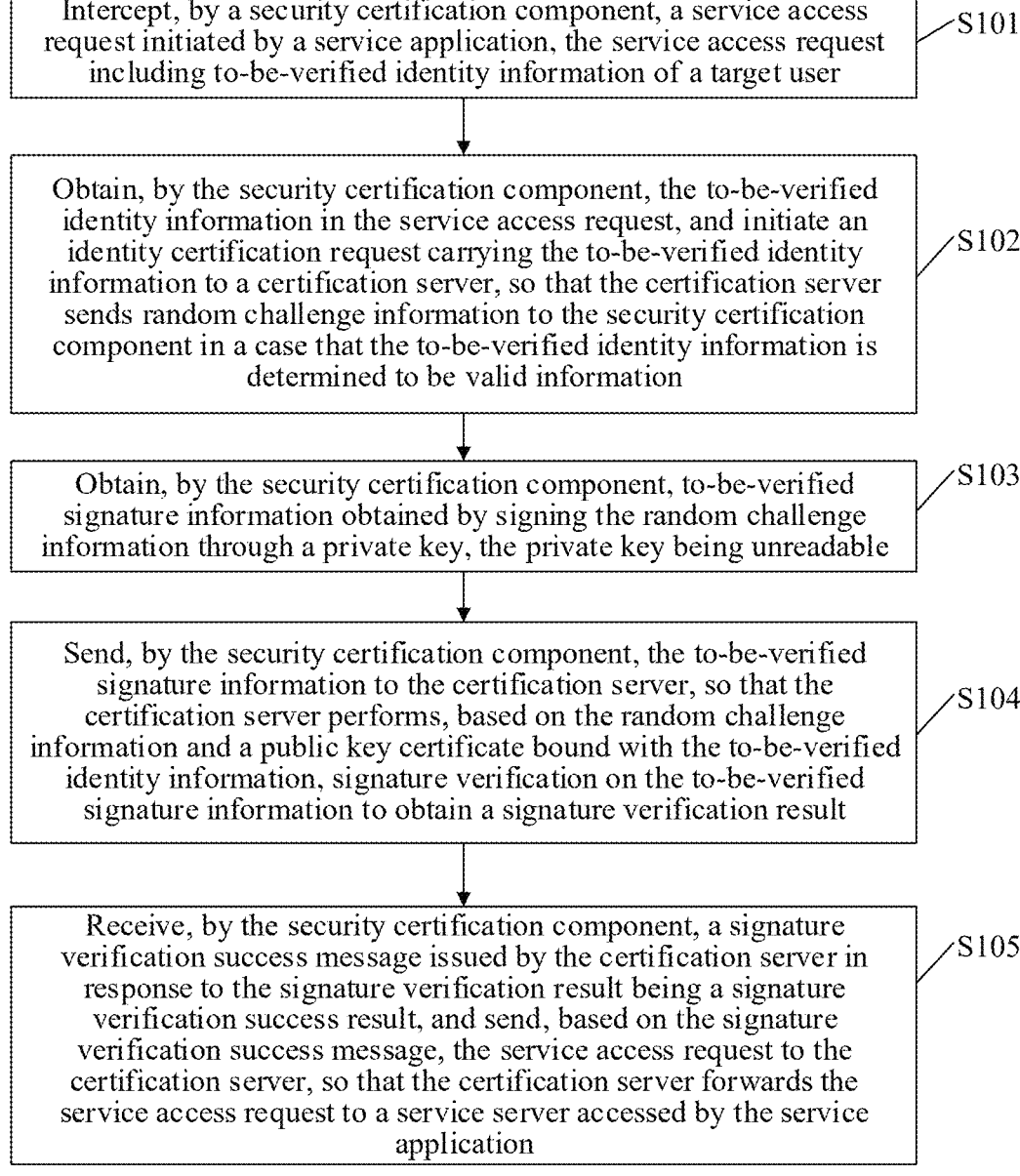

Intercept, by a security certification component, a service access request initiated by a service application, the service access request including to-be-verified identity information of a target user    S101

Obtain, by the security certification component, the to-be-verified identity information in the service access request, and initiate an identity certification request carrying the to-be-verified identity information to a certification server, so that the certification server sends random challenge information to the security certification component in a case that the to-be-verified identity information is determined to be valid information    S102

Obtain, by the security certification component, to-be-verified signature information obtained by signing the random challenge information through a private key, the private key being unreadable    S103

Send, by the security certification component, the to-be-verified signature information to the certification server, so that the certification server performs, based on the random challenge information and a public key certificate bound with the to-be-verified identity information, signature verification on the to-be-verified signature information to obtain a signature verification result    S104

Receive, by the security certification component, a signature verification success message issued by the certification server in response to the signature verification result being a signature verification success result, and send, based on the signature verification success message, the service access request to the certification server, so that the certification server forwards the service access request to a service server accessed by the service application    S105

FIG. 5

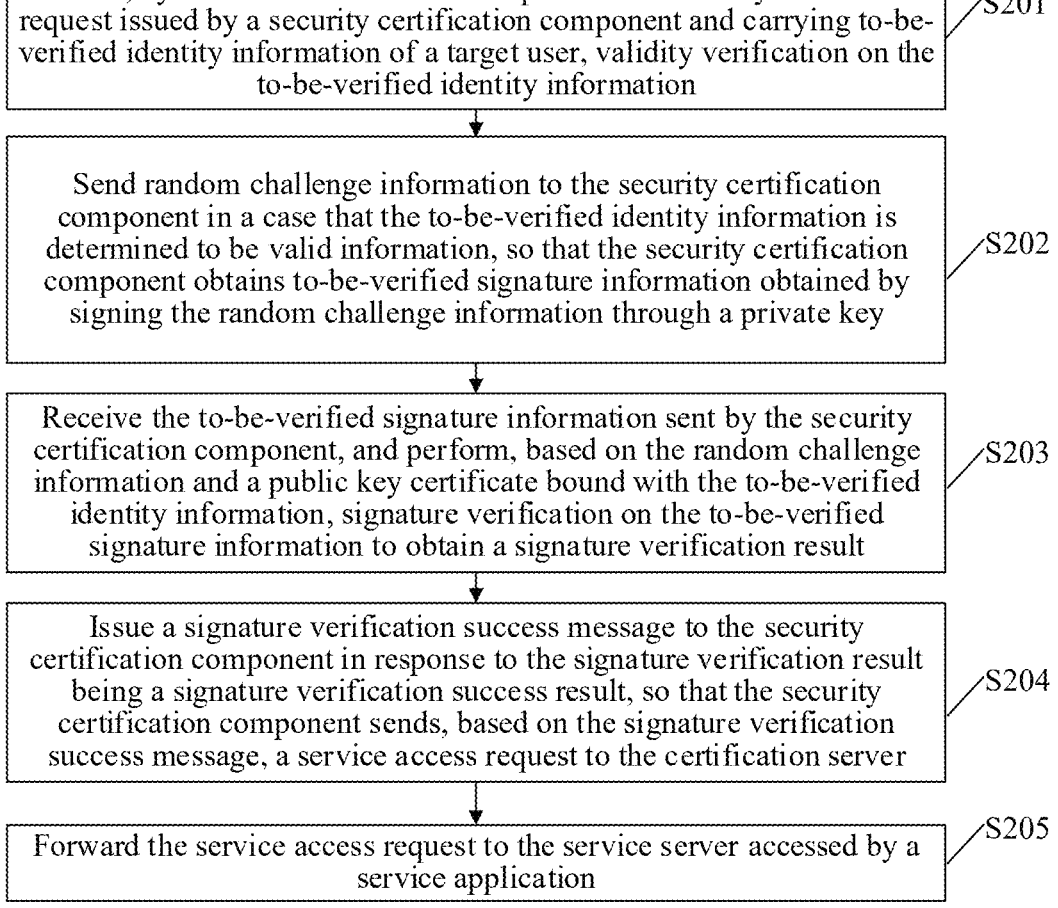

Perform, by a certification server in response to an identity certification request issued by a security certification component and carrying to-be-verified identity information of a target user, validity verification on the to-be-verified identity information — S201

Send random challenge information to the security certification component in a case that the to-be-verified identity information is determined to be valid information, so that the security certification component obtains to-be-verified signature information obtained by signing the random challenge information through a private key — S202

Receive the to-be-verified signature information sent by the security certification component, and perform, based on the random challenge information and a public key certificate bound with the to-be-verified identity information, signature verification on the to-be-verified signature information to obtain a signature verification result — S203

Issue a signature verification success message to the security certification component in response to the signature verification result being a signature verification success result, so that the security certification component sends, based on the signature verification success message, a service access request to the certification server — S204

Forward the service access request to the service server accessed by a service application — S205

FIG. 6

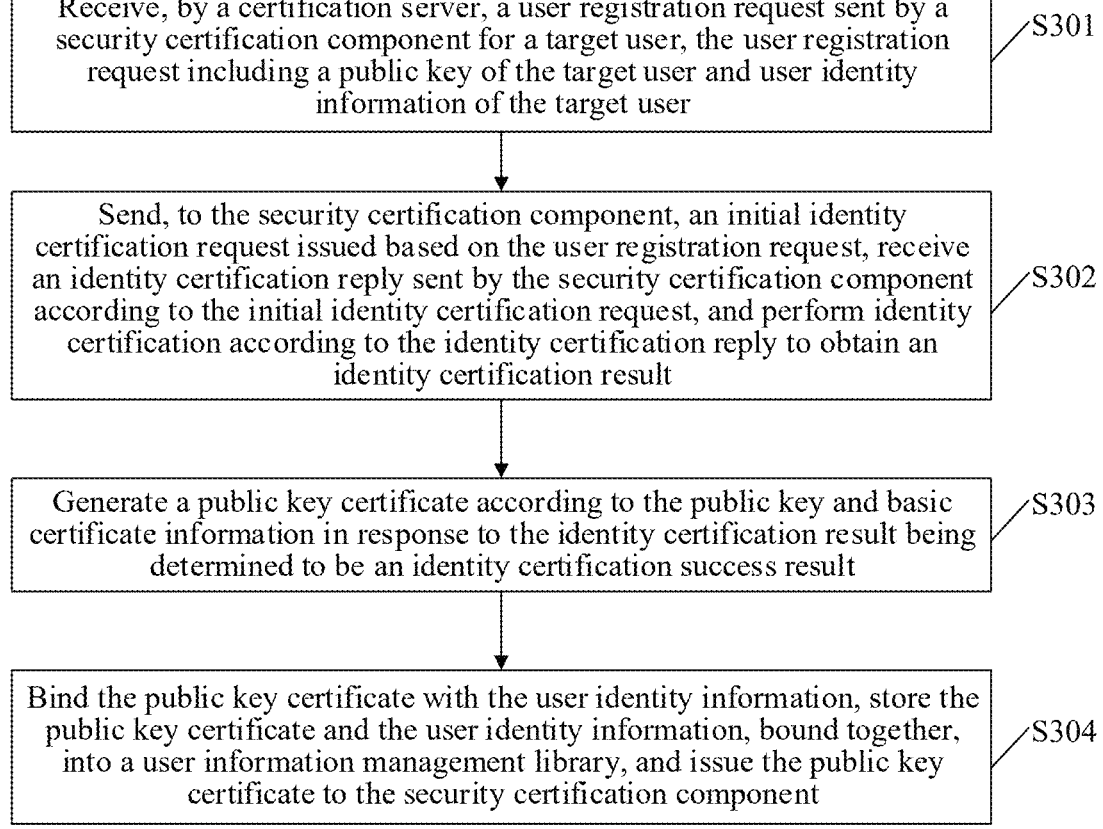

Receive, by a certification server, a user registration request sent by a security certification component for a target user, the user registration request including a public key of the target user and user identity information of the target user ⟋S301

Send, to the security certification component, an initial identity certification request issued based on the user registration request, receive an identity certification reply sent by the security certification component according to the initial identity certification request, and perform identity certification according to the identity certification reply to obtain an identity certification result ⟋S302

Generate a public key certificate according to the public key and basic certificate information in response to the identity certification result being determined to be an identity certification success result ⟋S303

Bind the public key certificate with the user identity information, store the public key certificate and the user identity information, bound together, into a user information management library, and issue the public key certificate to the security certification component ⟋S304

FIG. 7

ACCESS CONTROL METHOD BASED ON ZERO-TRUST SECURITY, DEVICE, AND STORAGE MEDIUM

RELATED APPLICATIONS

This application is a continuation of International Application No. PCT/CN2021/108408, entitled "ACCESS CONTROL METHOD BASED ON ZERO-TRUST SECURITY, AND DEVICE AND STORAGE MEDIUM" and filed on Jul. 26, 2021, which claims priority to Chinese Patent Application No. 202110660863.1, entitled "ACCESS CONTROL METHOD BASED ON ZERO-TRUST SECURITY, DEVICE, AND STORAGE MEDIUM" and filed on Jun. 15, 2021. The entire disclosures of the prior applications are hereby incorporated by reference in their entirety.

FIELD OF THE TECHNOLOGY

This disclosure relates to the field of cloud technologies, including to an access control method based on zero-trust security, a device, and a storage medium.

BACKGROUND OF THE DISCLOSURE

In recent years, with the popularity of cloud, Internet of Things, and other technologies, an intra-enterprise network environment is more complex, and a network boundary is fuzzier. Traditional security products meet some challenges, and a zero-trust concept is gradually booming. An aspect of zero-trust security is "Never Trust, Always Verify". A trust chain is established through user trust, device trust, network link trust, and resource permission trust, and the security and trust of the trust chain can be ensured by always verifying dynamically.

Related zero-trust solutions usually obtain a user identifier (usually expressed as an identity document (ID), a token, a bill, or another name) through initial identity certification (user name passwords, dynamic passwords, multi-factor certification, or the like), and store the user identifier in a terminal device. When accessing a target service again, a client appends the previously obtained user identifier in an access request to be sent, and a server verifies a user identity by verifying the identifier. However, since zero-trust eliminates the network boundary over network topology, an access may be initiated from any position for resources originally required to be accessed within an Intranet (physical network boundary), thereby facilitating both a valid user and an attacker. Once the terminal device is broken and the user identifier is leaked, the attacker may access resources protected by a zero-trust system through the user identifier of the valid user. Therefore, the security of the zero-trust system in terms of identity information is still required to be improved.

SUMMARY

Embodiments of this disclosure include an access control method, a device, and a storage medium. The embodiments can be based on zero-trust security and improve the security of a zero-trust system in terms of identity information.

In an aspect of this disclosure, an access control method is provided. In the access control method, a service access request of a service application is received. The service access request includes identity information of a user. An identity validation request is sent to a server. The identity validation request includes the identity information of the user. Challenge information is received from the server based on the identity information of the user in the identity validation request being determined to be valid. Signature information of the challenge information is generated based on the challenge information and a private key. The signature information is sent to the server. A signature valid message is received from the server based on the challenge information being obtained from the signature information with a public key associated with the identity information of the user. Based on the signature valid message, the service access request is sent to the server.

In an aspect of this disclosure, an access control method is provided. In the access control method, an identity validation request that includes identify information of a user is received from a user device. A determination is made as to whether the identity information is valid. Challenge information is sent to the user device based on the identity information being determined to be valid. Signature information of the challenge information that is generated based on the challenge information and a private key is received from the user device. A determination is made as to whether the challenge information is obtained from the signature information with a public key associated with the identity information. A signature valid message is sent to the user device based on the challenge information being obtained from the signature information with the public key. A service access request is received from the user device based on the signature valid message.

In an aspect of this disclosure, an access control apparatus including processing circuitry is provided. The processing circuitry is configured to receive a service access request of a service application. The service access request includes identity information of a user. The processing circuitry is configured to send an identity validation request to a server. The identity validation request includes the identity information of the user. The processing circuitry is configured to receive challenge information from the server based on the identity information of the user in the identity validation request being determined to be valid. The processing circuitry is configured to generate signature information of the challenge information based on the challenge information and a private key. The processing circuitry is configured to send the signature information to the server. The processing circuitry is configured to receive a signature valid message from the server based on the challenge information obtained from the signature information with a public key associated with the identity information of the user. Further, the processing circuitry is configured to send, based on the signature valid message, the service access request to the server.

In an aspect of this disclosure, an access control apparatus including processing circuitry is provided. The processing circuitry is configured to receive, from a user device, an identity validation request that includes identify information of a user. The processing circuitry is configured to determine whether the identity information is valid. The processing circuitry is configured to send challenge information to the user device based on the identity information being determined to be valid. The processing circuitry is configured to receive, from the user device, signature information of the challenge information that is generated based on the challenge information and a private key. The processing circuitry is configured to determine whether the challenge information is obtained from the signature information with a public key associated with the identity information. The processing circuitry is configured to send a signature valid message to the user device based on the challenge information being obtained from the signature information with the public key. The processing circuitry is further configured to receive a service access request from the user device based on the signature valid message.

In an aspect of this embodiment of this disclosure, a computer device is provided. The computer device includes a processor, a memory and a network interface.

The processor is connected to the memory and the network interface. The network interface is configured to provide a data communication function. The memory is configured to store a computer program. The processor is configured to invoke the computer program to perform one or more methods of this disclosure.

In an aspect of this disclosure, a non-transitory computer-readable storage medium is provided. The non-transitory computer-readable storage medium stores instructions which when executed by a processor cause the processor to perform one or more methods of this disclosure.

In an aspect of this embodiment of this disclosure, a computer program product or a computer program is provided. The computer program product or the computer program includes computer instructions. The computer instructions are stored in a computer-readable storage medium. A processor of a computer device reads the computer instructions from the computer-readable storage medium. The processor executes the computer instructions, so as to enable the computer device to perform one or more methods of this disclosure.

In an embodiment of this disclosure, a security certification component on a terminal device intercepts a service access request initiated by a service application, obtains to-be-verified identity information in the service access request, and initiates an identity certification request carrying the to-be-verified identity information to a certification server, so that the certification server sends random challenge information to the security certification component when the to-be-verified identity information is determined to be valid, and then signs the random challenge information through a private key to obtain to-be-verified signature information. Then, the to-be-verified signature information is sent to the certification server, so that the certification server performs, based on the random challenge information and a public key, signature verification processing on the to-be-verified signature information. If the signature verification is successful, a signature verification success message issued by the certification server is received, and the service access request is sent to the certification server based on the signature verification success message, so that the certification server forwards the service access request to a service server accessed by the service application. The private key is unreadable. With the solution proposed in this embodiment of this disclosure, an unreadable private key can prevent a trust root of a user identity certificate from being leaked. Then new to-be-verified signature information is obtained through random challenge information generated by a certification server and the private key at each identity certification. Therefore, the to-be-verified signature information required at each identity certification is different, so that an attacker cannot steal a user identity, thereby improving the security of a zero-trust system in terms of identity information.

BRIEF DESCRIPTION OF THE DRAWINGS

FIG. 5 is a schematic flowchart of an access control method according to an embodiment of this disclosure.

FIG. 6 is a schematic flowchart of another access control method according to an embodiment of this disclosure.

FIG. 7 is a schematic flowchart of a user registration method according to an embodiment of this disclosure.

DESCRIPTION OF EMBODIMENTS

Figures 1, 2:
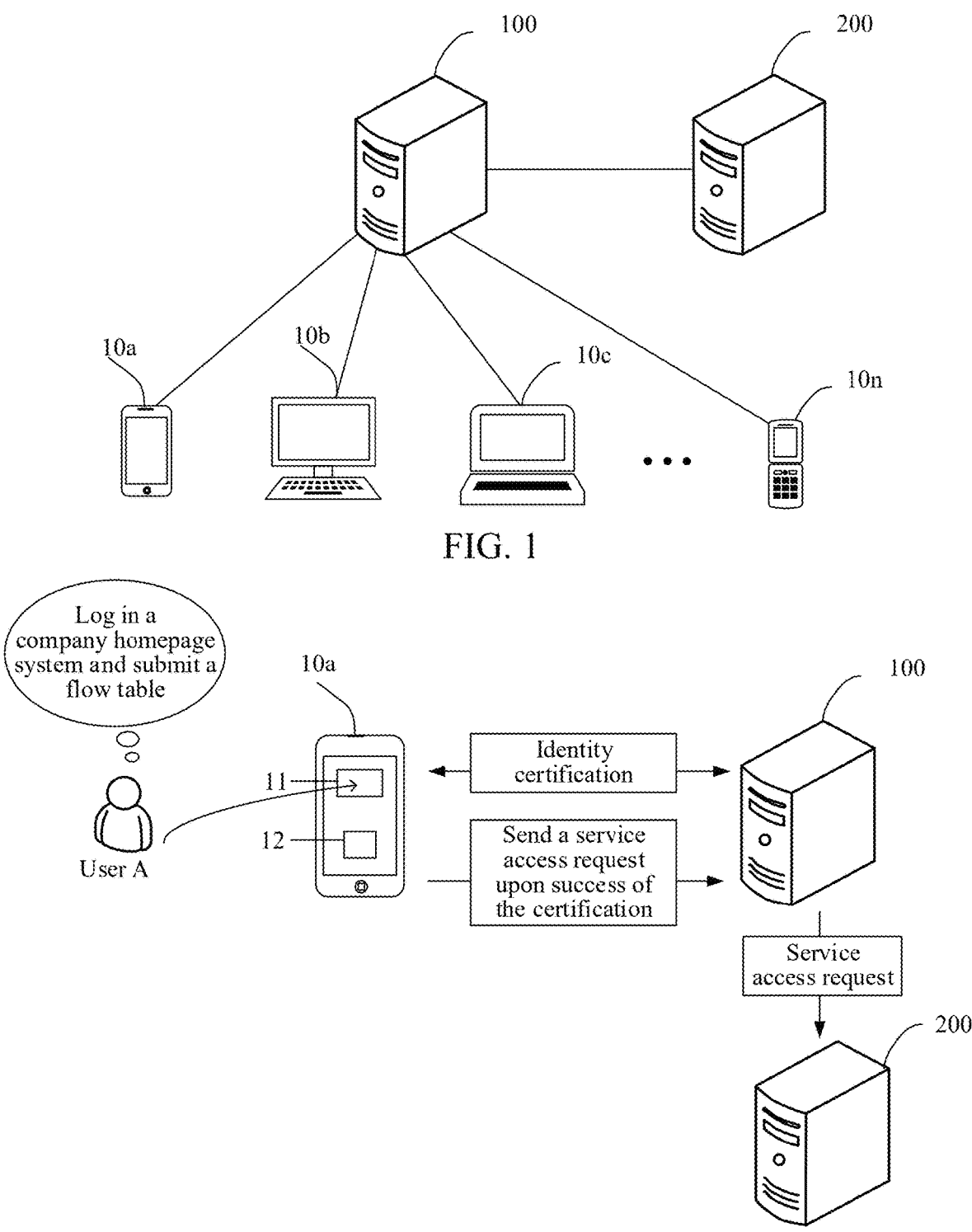
FIG. 1 is a network architecture diagram according to an embodiment of this disclosure.
FIG. 2 is a schematic diagram of a scenario of access control according to an embodiment of this disclosure.

Technical solutions in embodiments of this disclosure are described with reference to the accompanying drawings in the embodiments of this disclosure. The described embodiments are merely some rather than all of the embodiments of this disclosure. Other embodiments are within the scope of this disclosure.

It is to be explained that in this specification, claims, and accompanying drawings of this disclosure, the terms "first", "second", and so on are intended to distinguish similar objects but do not necessarily indicate a specific order or sequence. It is to be understood that such used data is interchangeable where appropriate so that the embodiments of this disclosure described here can be implemented in an order other than those illustrated or described here. Moreover, the terms "include", "have" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device. An access control method of this disclosure will be described below. This specification provides method operation steps described in the embodiments or flowcharts. However, more or fewer operation steps may be included. The sequence of steps enumerated in the embodiments is only one of many sequences of performing the steps, and is not a unique sequence of implementation. When the method is performed in an actual system or server product, the method may be performed according to method orders shown in the embodiments or the accompanying drawings or performed in parallel (for example, in a parallel processor or multi-thread processing environment).

A cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

Cloud computing may refer to a delivery and use mode of information technology (IT) infrastructure, and refer to obtaining required resources in an on-demand and scalable manner through a network. Generalized cloud computing may refer to a delivery and use mode of services, and refer to obtaining the required services in an on-demand and scalable manner through the network. Such services may be IT and software, Internet-related services, or other services. Cloud computing is a product of integration of traditional computer and network technologies such as grid computing, distributed computing, parallel computing, utility computing, network storage technologies, virtualization, and load balance.

With the diversification of the Internet, real-time data streams and connecting devices, and the promotion of search services, social networks, mobile commerce, and open collaboration, cloud computing has developed rapidly. Unlike the previous parallel distributed computing, the generation of cloud computing will promote revolutionary change of the whole Internet mode and enterprise management mode.

A solution provided by embodiments of this disclosure includes a cloud security subordinate to the field of cloud technology.

Cloud security may refer to the general term of security software, hardware, users, organizations, and security cloud platforms based on cloud computing business mode applications. Cloud security integrates emerging technologies and concepts such as parallel processing, grid computing, and unknown virus behavior judgment. Through a large number of networked clients to monitor abnormal behaviors of software in the network, latest information of Trojan and malicious programs in the Internet is obtained and sent to a server for automatic analysis and processing, and then the solutions of virus and Trojan are distributed to each client.

Main research directions of cloud security include: (1) cloud computing security, which is directed, for example, to how to ensure the security of cloud and various applications on the cloud, including cloud computer system security, secure storage and isolation of user data, user access certification, information transmission security, network attack protection, compliance audit, and the like; (2) cloudization of security infrastructure, which is directed, for example, to how to use cloud computing to build and integrate security infrastructure resources and optimize a security protection mechanism, including building ultra-large-scale security events and an information acquisition and processing platform through the cloud computing technology, achieving mass information acquisition and correlation analysis, and improving the network-wide security event control ability and risk control ability; and (3) cloud security services, which is directed, for example, to a variety of cloud computing platform-based security services for users, such as anti-virus services.

A solution provided by embodiments of this disclosure involves secure certification in terms of identity information of a zero trust system.

Zero trust, as a security concept, is not essentially the same dimensional concept as traditional security products/devices. However, since zero trust architecture will work with the traditional security products/devices when they fall, there may even be situations in which some traditional security products/devices are replaced.

Zero trust may be understood literally. That is, it is not trustable to any object. For example, in an access control system, it is assumed that a person (user), a terminal, a resource, and the like are not trustable. By establishing a trust chain from the person to the terminal to the resource, and dynamically verifying the trust chain in real time, a trusted request for resource security is realized, network attacks are blocked, and network security is improved.

Zero trust may be applied to a variety of application scenarios, for example, telecommuting, cloud computing platforms, big data centers, Internet of things, 5G applications, and the like.

FIG. 1 is a network architecture diagram according to an embodiment of this disclosure. As shown in FIG. 1, the network architecture may include a certification server 100, a service server 200 and a terminal device cluster. The terminal device cluster may include a plurality of terminal devices. As shown in FIG. 1, the terminal device cluster may include a terminal device 10a, a terminal device 10b, a terminal device 10c, . . . , and a terminal device 10n. As shown in FIG. 1, the terminal device 10a, the terminal device 10b, the terminal device 10c, . . . , and the terminal device 10n may be respectively connected to the certification server 100 through a network, so that each terminal device may perform data interaction with the certification server 100 through the network, and each terminal device may receive certification data from the certification server 100. As shown in FIG. 1, a network connection may be performed between the certification server 100 and the service server 200. When the certification server 100 determines that the terminal device completes certification, a service request initiated by the terminal device for a certain application may be forwarded to the service server 200.

As shown in FIG. 1, each terminal device may be integrally installed with a target application and a service application. The target application includes a security certification component. When the target application is run on each terminal device, the terminal device may intercept a service access request for the service application through the target application, obtain relevant certification data, and perform data interaction with the certification server 100 shown in FIG. 1. After determining that the terminal device completes identity certification, the certification server 100 will receive the service access request intercepted by the target application, and then forward the service access request to the service server 200. Then the terminal device may access a protected resource corresponding to the service access request. The service access request refers to a request to access the protected resource. The protected resource refers to a resource which can only be accessed by a specific user, for example, an intra-enterprise resource. A non-enterprise employee cannot access the intra-enterprise resource. Therefore, when the terminal device initiates an access request for the intra-enterprise resource through the service application, the terminal device will first complete, through the target application and the certification server 100 together, identity certification of a target user initiating the service access request. The target application May be an application, such as a zero-trust client, having data information functions such as account management, data acquisition and certification, and request interception and forwarding. The protected application may be a game application, a video editing application, a social application, an instant messaging application, a live application, a short video application, a video application, a music application, a shopping application, a novel application, a payment application, a browser, or another application which has the function of displaying data information such as text, images, audio, and video.

Each terminal device may perform data interaction with the certification server 100 to complete identity certification in the following process. After intercepting a service access request for a protected application through a target application, each terminal device may obtain to-be-verified identity information of a target user from the service access request. Then, each terminal device may obtain the to-be-verified identity information in the service access request, and initiate an identity certification request carrying the to-be-verified identity information to the certification server 100. And then, the certification server 100 may verify the to-be-verified identity information, and send random challenge information to the corresponding terminal device after determining that the to-be-verified identity information is valid information. After receiving the random challenge information, the terminal device may sign the random challenge information in a public and private key storage component through a private key corresponding to the target user in the public and private key storage component to obtain to-be-verified signature information, and then send the to-be-verified signature information to the certification server 100. The certification server 100 then verifies the to-be-verified signature information through a public key certificate corresponding to the target user. If the certification server 100 determines that the signature verification is successful, the certification server 100 determines that the terminal device completes the certification, and issues a signature verification success message to the terminal device. The terminal device may send the service access request to the certification server 100. Then, the certification server 100 may forward the service access request to the service server 200. The process of determining that the to-be-verified identity information is valid information may be: searching for the same valid information as the to-be-verified identity information in a user information management library, that is, determining whether the target user is in an access-allowed user list.

The public and private key storage component is a component having a storage function, a computing function and a data unreadable function. In other words, the private key in the public and private key storage component can only be used in the public and private key storage component, and cannot be derived from the public and private key storage component, thereby ensuring that the private key is not leaked. Illustratively, the public and private key storage component may be a hardware device independent of the terminal device, for example, a USB Key. The public and private key storage component is connected to the terminal device for use. The public and private key storage component may also be a hardware device embedded within the terminal device, for example a trusted platform module (TPM) security chip. Illustratively, the public and private key storage component may also be a software system run on the terminal device, for example, a virtualization-based isolation technology, a trusted execution environment, and the like. Illustratively, a user account corresponds to a public and private key storage component.

Since an attacker cannot obtain a private key in the public and private key storage component, to-be-verified signature information at each certification cannot be determined, the certification cannot be completed, and a protected application cannot be accessed accordingly. With the method of this disclosure, identity cloning attacks can be prevented.

It is to be understood that the method provided by the embodiments of the present disclosure may be performed by a computer device. The computer device includes, but is not limited to, a terminal device, a certification server or a service server. The certification server and the service server may both be an independent physical server, may also be a server cluster or a distributed system composed of a plurality of physical servers, and may also be a cloud server providing basic cloud computing services, such as a cloud database, a cloud service, cloud computing, a cloud function, cloud storage, a network service, cloud communication, a middleware service, a domain name service, a security service, a content delivery network (CDN), and a big data and artificial intelligence platform. The terminal device may be a smart phone, a tablet computer, a notebook computer, a desktop computer, a palmtop computer, a mobile Internet device (MID), a wearable device (for example, a smart watch, a smart bracelet, or the like), a smart computer, or a smart terminal capable of running the application client. The terminal device, the certification server and the service server may be directly or indirectly connected in a wired or wireless communication manner. This is not limited in this embodiment of this disclosure.

It is to be understood that the computer device (for example, the certification server 100, the service server 200, the terminal device 10a, the terminal device 10b, the terminal device 10c, . . . , and the terminal device 10n) may be a node in a distributed system. The distributed system may be a blockchain system. The blockchain system may be a distributed system formed by the plurality of nodes connected in the form of network communication. A peer-to-peer (P2P) network may be formed between the nodes. The P2P protocol is an application-layer protocol running over a transmission control protocol (TCP). In the distributed system, a computer device in any form, for example, an electronic device such as a server or a terminal device, may become a node in the blockchain system by joining the P2P network.

The following illustrates that the terminal device 10a intercepts a service access request for a protected application, performs data interaction with the certification server 100 to complete certification, and then forwards the service access request to the corresponding service server 100 through the certification server 100.

Figure 3:
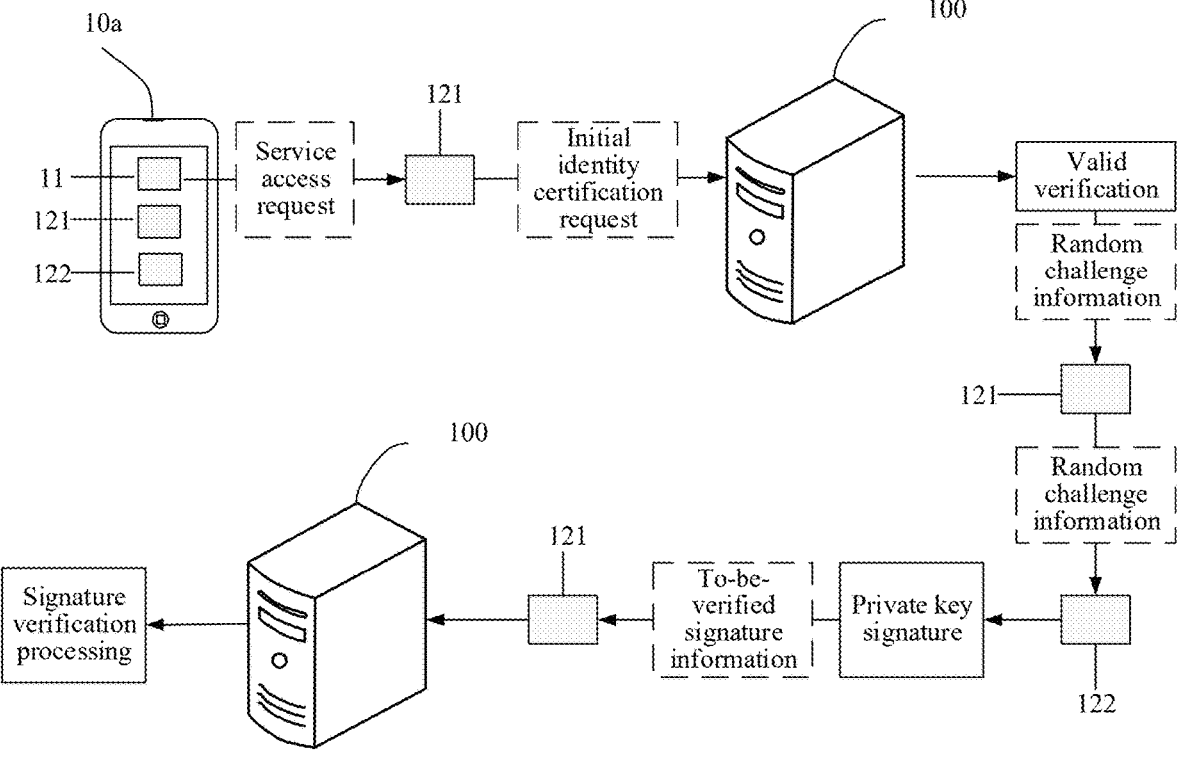
FIG. 3 is a schematic diagram of a scenario of access control according to an embodiment of this disclosure.
Figure 4:
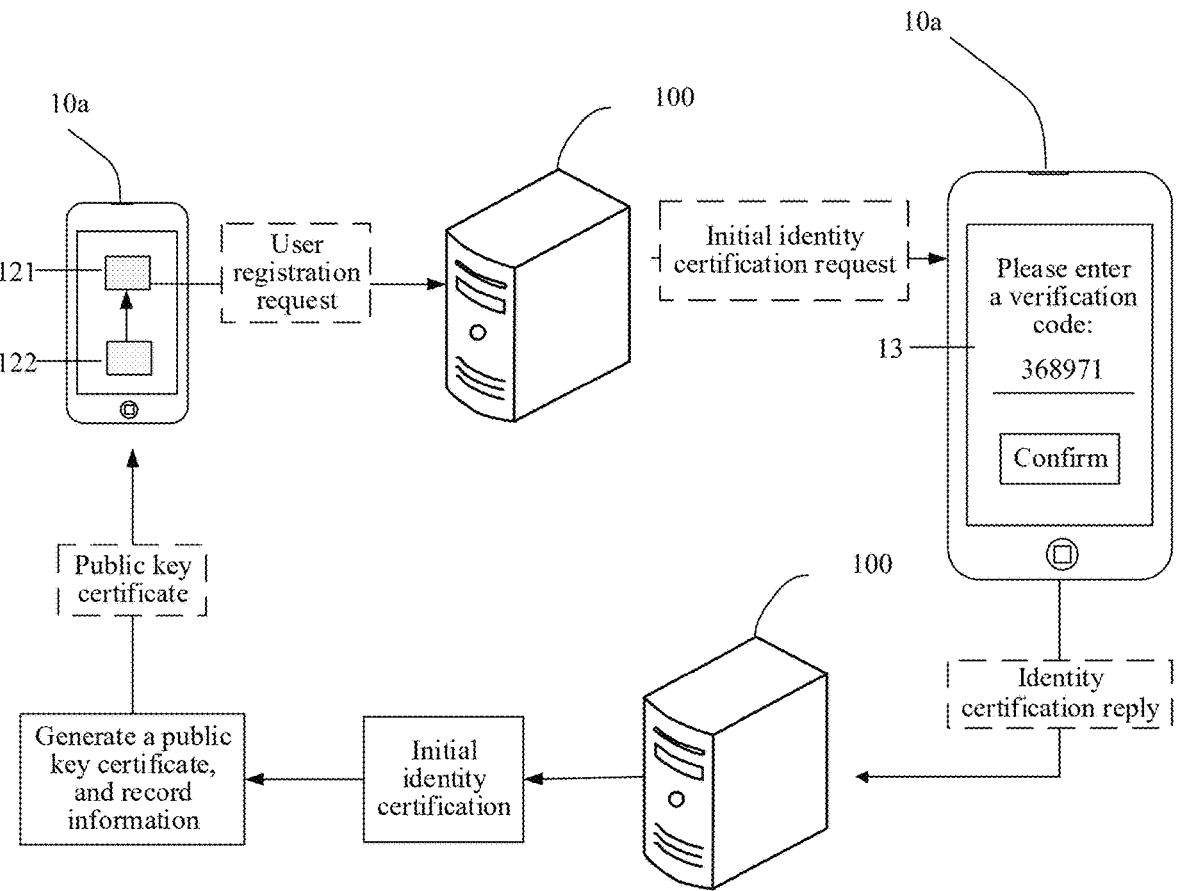
FIG. 4 is a schematic diagram of a scenario of access control according to an embodiment of this disclosure.

For ease of understanding, reference is made to FIGS. 2-4, which are schematic diagrams of a scenario of access control according to an embodiment of this disclosure. As shown in FIG. 2, user A has a binding relationship with the terminal device 10a, and a service application 11 and a target application 12 are installed on the terminal device 10a. The service application 11 may be a browser, and the target application 12 may be a zero-trust client bound with an intra-enterprise resource of a company in which user A is employed. After user A completes a user registration process of the target application 12 through the terminal device 10a, the target application 12 may perform zero-trust certification on the service application 11. After the certification is completed, user A may complete the access and use of the intra-enterprise resource through the service application 11.

Performing zero-trust certification on the service application 11 may refer to certifying the identity of user A, and determining whether user A has a right to access the intra-enterprise resource, thereby ensuring that invalid personnel cannot access the intra-enterprise resource. As shown in FIG. 2, it is assumed that user A has completed the user registration process of the target application 12. At this moment, if user A wants to log in a company homepage system to submit a flow table, user A may input a website of the company homepage system in the service application 11 and then initiate a service access request to the company homepage system. The service access request includes to-be-verified identity information of user A. Since the identity of user A is unknown at this moment, if the service access request is directly forwarded to the service server 200, the service server 200 may reject the service access request. Therefore, the target application 12 may perform data inter-action with the certification server 100 to perform identity certification on user A. After it is determined that the identity certification of user A is successful, the target application 12 may forward the service access request to the certification server 100, and the certification server 100 may forward the service access request to the service server 200. The service server 200 is a server corresponding to the company homep-age system of the company in which user A is employed. After the service server 200 responds to the service access request of user A, user A may enter the company homepage system. It is to be explained that in an implementation, when the target application 12 and the certification server 100 jointly complete the identity certification of user A, identity certification of user A will no longer be required for subse-quent service access requests of the intra-enterprise resource within a period of time, and user A may directly access and use the intra-enterprise resource. That is to say, after user A logs in the company homepage system only, a flow table may be directly submitted. In another implementation, the identity certification of user A is required for subsequent service access requests of the intra-enterprise resource.

Further, for an exemplary implementation scenario of performing data interaction between the terminal device 10a and the certification server 100 and performing identity certification on user A, reference may be made to FIG. 3. As shown in FIG. 3, the terminal device 10a includes a security certification component 121 corresponding to the target application 12, and a public and private key storage com-ponent 122 connected to the terminal device 10a, or a public and private key storage component 122 run in the terminal device 10a. The security certification component 121 may intercept and forward requests. Request forwarding includes forwarding a request for performing identity certification on an uncertified service access request and forwarding the certified service access request. Request interception refers to intercepting and blocking the uncertified service access request. The public and private key storage component 122 has a storage data unreadable attribute and an operation attribute, may be a built-in component of the terminal device 10a, or may be an external component connected to the terminal device 10a. The storage data unreadable attribute means that data stored in the public and private key storage component 122 cannot be externally read and can only be used in the public and private key storage component 122. The operation attribute means that the public and private key storage component 122 may compute the data. As shown in FIG. 3, the service application 11 generates a service access request in response to an operation of user A. The terminal device 10a may intercept the service access request through the security certification component 121, and then obtains to-be-verified identity information of user A from the service access request. The to-be-verified identity information may be information such as a user name, an account number, and a bound mobile phone number. The terminal device 10a may then initiate an identity certification request carrying the to-be-verified identity information to the certification server 100 through the security certification component 121. After receiving the identity certification request, the certification server 100 may determine whether the to-be-verified identity information is valid information. The process of determining whether the to-be-verified identity information is valid infor-mation may be: searching for the same identity information as the to-be-verified identity information in the user infor-mation management library. If the identity information is found, it is indicated that the to-be-verified identity infor-mation is the valid information. If it is determined that the to-be-verified identity information is the valid information, the certification server may generate random challenge information and then sends the random challenge informa-tion to the security certification component 121. The security certification component 121 may send the random challenge information into the public and private key storage compo-nent 122. The terminal device 10a may sign the random challenge information through a private key in the public and private key storage component 122 to obtain to-be-verified signature information. Then the terminal device 10a may forward the to-be-verified signature information to the certification server 100 through the security certification component 121. The certification server 100 may obtain a public key certificate bound with the to-be-verified identity information in the user information management library, and then perform signature verification processing on the to-be-verified signature information to obtain a signature verifi-cation result. Signing through the private key refers to encrypting the random challenge information. Decrypting a public key refers to decrypting the encrypted to-be-verified signature information. If the information obtained after decryption is the same as the random challenge information sent by the certification server 100, it is indicated that the public and private keys are paired, and the signature veri-fication is successful, and the identity certification of the user is successful.

Further, if user A (the target user) is a new employee of the company and the user registration is not completed through the target application 12, the user information management library in the certification server 100 does not have identity information and a public key certificate related to user A, the foregoing identity certification process cannot be completed, and user A cannot access the intra-enterprise resource. Therefore, when user A first uses the target appli-cation 12, the user registration needs to be performed first. For an exemplary implementation process, reference may be made to FIG. 4. As shown in FIG. 4, the terminal device 10a may generate a public and private key pair of user A in the public and private key storage component 122. The public and private key pair includes a private key and a public key. The private key and the public key are a pair of keys. The private key is owned by user A. That is to say, except user A, nobody else knows the private key. The public key is public, all people may obtain the public key of user A, and data signed by the private key may be decrypted by the public key. The terminal device 10a may send a user registration request for user A to the certification server 100. The user registration request includes the public key and user identity information of user A. After receiving the user registration request, the certification server 100 may perform initial identity certification on user A according to the user registration request, namely, send an initial identity certification request to the terminal device 10a, receive an identity certification reply returned by the terminal device 10a, and then perform identity certification based on the identity certification reply. As shown in FIG. 4, the certification server 100 may search for the user identity information of user A in the user information management library, obtain a bound contact account, and then send a random dynamic code to the contact account. Meanwhile, the certification server 100 may issue an initial identity certification request to the terminal device 10a. The terminal device 10a may display a dynamic code certification interface 13 according to the initial identity certification request. After obtaining a dynamic code through a pre-reserved contact account, user A may input in the dynamic code certification interface 10a, and then click/tap a confirm button. Then the terminal device 10a may return the dynamic code inputted by user A to the certification server 100. The certification server 100 determines that the returned dynamic code is the same as a random dynamic code sent initially, determines that the identity certification of user A is successful, generates a public key certificate according to the public key of user A, binds the user identity information of user A with the public key certificate, and then stores the user identity information and the public key certificate together in the user information management library. Also, the certification server 100 returns the public key certificate to the terminal device 10a. Through the foregoing process, the user registration of user A is completed. When user A accesses the intra-enterprise resource subsequently through the service application 11, the identity certification shown in FIG. 3 may be performed.

FIG. 5 is a schematic flowchart of an access control method according to an embodiment of this disclosure. The method is performed by the terminal device in FIG. 1, which may be any terminal device (also including the terminal device 10a, the terminal device 10b, the terminal device 10c, and the terminal device 10n) in the terminal device cluster in FIG. 1. As shown in FIG. 5, the access control process may include the following steps:

In step S101, intercept, by a security certification component, a service access request initiated by a service application, the service access request including to-be-verified identity information of a target user. In an example, a service access request of a service application is received, the service access request including identity information of a user.

In an example, the service application refers to application software used by a target user which needs to perform zero-trust certification. The target user may access a protected internal resource through these application software. The internal resource may refer to a business resource controlled, owned and used by an enterprise, and accessed by only internal personnel of the enterprise. For example, an internal resource of a school can only be used by teachers and students of the school. With the concept of zero-trust security, internal resources that are originally required to be accessed within an Intranet (physical network boundary) may now be accessed from any position by the internal personnel of the enterprise. Therefore, the terminal device is no longer run in a relatively secure Intranet environment, but is likely to run in any environment, such as a home, a cafe, or a hotel. In these environments, security threats, such as phishing attacks and water pit attacks, to which the target user is potentially exposed are greatly increased. Therefore, when the target user initiates a service access request through an application, the terminal device needs to perform zero-trust certification, namely, identity certification, on the service access request.

In an example, the service application may include browser/server (B/S) architecture application software and client/server (C/S) architecture application software. For the B/S architecture application software, the application may refer to a browser. For the C/S architecture application software, the application may refer to specific client software. Protected internal resources may refer to a service end of an application, and these services are placed on an Intranet or a cloud end, and need to perform identity certification on an access request, so that resources behind the services can be protected to be accessed only by valid users. Therefore, the security certification component may intercept the service access request initiated by the service application. The security certification component may be required to only intercept service access requests initiated by applications for access and use of internal resources, whereas the security certification component is not required to intercept service access requests initiated by service applications for other resources. In an embodiment, the security certification component may initially identify a service access request initiated by an application, such as analyzing whether address information in the service access request is in a list of to-be-verified addresses, or determining whether the service access request is for accessing an internal resource. If yes, the security certification component may intercept the service access request.

In an example, the security certification component and a public and private key storage component are run on the terminal device; or, the security certification component is run on the terminal device and is connected to the public and private key storage component. The security certification component may be a built-in functional component in a zero-trust client (that is, the target application 12 shown in FIG. 2). The security certification component may achieve the interception and forwarding of a request. The service access request includes the to-be-verified identity information of the target user, such as account information, user name information, or information for uniquely identifying the target user.

In step S102, obtain, by the security certification component, the to-be-verified identity information in the service access request, and initiate an identity certification request carrying the to-be-verified identity information to a certification server, so that the certification server sends random challenge information to the security certification component in a case that the to-be-verified identity information is determined to be valid information. In an example, an identity validation request is sent to a server, the identity validation request including the identity information of the user. Challenge information is received from the server based on the identity information of the user in the identity validation request being determined to be valid.

In an example, after intercepting the service access request, the security certification component may extract the to-be-verified identity information of the target user therefrom, and then generate an identity certification request carrying the to-be-verified identity information. The security certification component may send the identity certification request to the certification server, and then wait for the processing of the certification server. After receiving the identity certification request, the certification server may determine whether the to-be-verified identity information is valid information, and may send random challenge information to the security certification component. The certification server may provide corresponding functional services such as a user information management service, a certification service and an access gateway for an identity certification process in a zero-trust system. It is to be explained that the certification server may be a server or a server cluster. The foregoing various functional services may be deployed on different servers, and only the deployment of various functional services on the same server is described herein. The random challenge information is information randomly generated by the certification server based on the current identity certification request, and may be a random number, a random string, or the like. The generated random challenge information may be different each time for the identity certification request initiated by the same target user. The to-be-verified identity information of the target user, belonging to valid information, exists in a user information management library in the certification server. The to-be-verified identity information of the target user, belonging to invalid information, does not exist in the user information management library in the certification server. In an example, identity verification failure prompt information sent by the certification server is obtained if the certification server determines that the to-be-verified identity information is the invalid information.

In step S103, obtain, by the security certification component, to-be-verified signature information, the to-be-verified signature information being obtained by signing the random challenge information through a private key, the private key being unreadable. In an example, signature information of the challenge information is generated based on the challenge information and a private key.

In an example, the process of obtaining, by the security certification component, to-be-verified signature information obtained by signing the random challenge information through a private key may be as follows. The security certification component transmits the obtained random challenge information to the public and private key storage component. The public and private key storage component signs the random challenge information through the private key in the public and private key storage component to obtain the to-be-verified signature information. The public and private key storage component transmits the to-be-verified signature information to the security certification component. The security certification component obtains the to-be-verified signature information transmitted by the public and private key storage component. The public and private key storage component has a data unreadable attribute. The public and private key storage component may also be referred to as an identity storage device for storing a trust root, such as the private key, of a user identity certificate of a target user. A key attribute of the public and private key storage component is that the data is unreadable, namely, secret information stored therein cannot be derived and copied. As long as this key attribute is satisfied, either a hardware device or a software system may be used as the public and private key storage component of this disclosure. In addition, when an external hardware device is connected to the terminal device, the external hardware device may also be referred to as the public and private key storage component of the terminal device. The hardware device is, for example, USB key (a hardware device with a built-in single-chip microcomputer or smart card chip), a TPM security chip, or the like. The software system is, for example, virtualization-based isolation computing, a trusted execution environment, or the like.

In an example, in an asymmetric encryption algorithm, two keys are required: a public key and a private key. The public key and the private key are a pair. A first party may sign confidential information with the private key of the first party and then send the confidential information to a second party. The second party may verify the signed confidential information received through the public key of the first party, thereby determining that the confidential information originates from the first party. The public and private key storage component stores the public key and the private key of the target user. The public key may be stored in a readable area in the public and private key storage component, but the private key can only be stored in an unreadable area in the public and private key storage component. That is to say, the private key of the target user can only be used in the public and private key storage component, and the private key of the target user cannot be read by the other components and devices.

In an example, the process of signing, by the security certification component, the random challenge information through a private key in the public and private key storage component to obtain to-be-verified signature information may be as follows. The public and private key storage component performs a hash operation on the random challenge information to obtain a digital digest of the random challenge information. The public and private key storage component performs asymmetric encryption processing on the digital digest through the private key in the public and private key storage component to obtain to-be-verified signature information for the random challenge information. The hash operation, also referred to as HASH, refers to that an input of an arbitrary length is transformed into an output of a fixed length by using a hash algorithm. The output value is the digital digest. The hash operation may include division hashing, multiplication hashing, Fibonacci hashing, and the like. It is to be understood that if the random challenge information is small, such as a random number, the random number may be asymmetrically encrypted directly by the public and private key storage component using the private key of the target user, and digital digest may be obtained without the hash operation thereon.

In step S104, send, by the security certification component, the to-be-verified signature information to the certification server, so that the certification server performs, based on the random challenge information and a public key certificate bound with the to-be-verified identity information, signature verification processing on the to-be-verified signature information to obtain a signature verification result. In an example, the signature information is sent to the server.

In an example, after the security certification component obtains the to-be-verified signature information, the security certification component sends the to-be-verified signature information to the certification server, and then waits for the certification server to perform, based on the random challenge information and a public key certificate bound with the to-be-verified identity information, signature verification processing on the to-be-verified signature information to obtain a signature verification result. The public key certificate is a digital certificate generated by the certification server according to the public key of the target user when the target user completes the user registration. The digital certificate is also called a "digital identity card" and a "network identity card", is an electronic file which is issued by a certificate certification center, is digitally signed by the certificate certification center, and contains an owner of the public key and information related to the public key, and may be used to prove the real identity of a digital certificate holder.

In step S105, receive, by the security certification component, a signature verification success message issued by the certification server in response to the signature verification result being a signature verification success result, and send, based on the signature verification success message, the service access request to the certification server, so that the certification server forwards the service access request to a service server accessed by the service application. In an example, a signature valid message is received from the server based on the challenge information being obtained from the signature information with a public key associated with the identity information of the user. Based on the signature valid message, the service access request is sent to the server.

In an example, when determining that the signature verification result is a signature verification success result, the certification server may issue a signature verification success message. When receiving the signature verification success message, the security certification component forwards the service access request to the certification server. Then, the certification server may forward the service access request to a service server accessed by the service application, namely a server where a service end corresponding to an internal resource is located.

The security certification component may add an access state to the target user. After intercepting the service access request, the security certification component may query the access state of the target user. If the access state is an allowed access state, the service access request is sent to the certification server, so that the certification server forwards the service access request to the service server accessed by the application. If the access state is an unknown access state, an identity certification request carrying the to-be-verified identity information is initiated to the certification server. The foregoing processes may all be realized by the security certification component. That is, the terminal device may add the access state to the target user in the security certification component. After the security certification component intercepts the service access request, the security certification component queries the access state of the target user. In this way, when the target user initiates service access requests for internal resources for multiple times within a short period of time, the security certification component is only required to perform identity certification on the target user when the target user first initiates the service access request.

When the identity certification of the target user is successful and the certification server issues the signature verification success message, a state adjustment instruction may also be issued together, and the security certification component adjusts the access state of the target user to an allowed access state according to the state adjustment instruction. Meanwhile, the security certification component may set an allowed access validity period for the access state of the target user. The access state of the target user is adjusted into the unknown access state in a case that current accumulated duration in which the access state of the target user is the allowed access state exceeds the allowed access validity period. Assuming that the allowed access validity period is one hour, when the identity of the target user is certificated by the certification server within one hour, the service access request initiated by the target user again may be directly forwarded to the service server without further identity certification.

The target user may be required to complete user registration prior to first accessing the internal resource to perform the foregoing identity certification process. The public and private key storage component may first generate a public and private key pair of the target user. The public and private key pair includes a private key and a public key. The public and private key storage component transmits the public key to the security certification component. The security certification component receives the public key transmitted by the public and private key storage component, and sends a user registration request for the target user to the certification server. The user registration request includes the public key of the target user and user identity information of the target user. The security certification component receives an initial identity certification request issued by the certification server based on the user registration request, and sends an identity certification reply to the certification server according to the initial identity certification request, so that the certification server performs initial identity certification according to the identity certification reply to obtain an initial identity certification result. The public key certificate issued by the certification server is received in response to the initial identity certification result being an initial identity certification success result. The security certification component transmits the public key certificate to the public and private key storage component, so that the public and private key storage component stores the public key certificate.

In an embodiment, the process of sending an identity certification reply to the certification server according to the initial identity certification request may be: displaying a dynamic code certification interface according to the initial identity certification request; obtaining a to-be-verified dynamic code in response to receiving an input determination operation on the dynamic code certification interface, and taking the to-be-verified dynamic code as the identity certification reply; and sending the identity certification reply to the certification server, so that the certification server compares the to-be-verified dynamic code with a random dynamic code, and determines an initial identity certification result according to a comparison result. The dynamic code certification interface is used for inputting the to-be-verified dynamic code. The user may input the to-be-verified dynamic code in the dynamic code certification interface according to the random dynamic code sent by the certification server to a contact account. The contact account has a binding relationship with the user identity information in the user information management library of the certification server. The initial identity certification result is an initial identity certification success result in response to the comparison result indicating that the to-be-verified dynamic code is the same as the random dynamic code. The initial identity certification result is an initial identity certification failure result in response to the comparison result indicating that the to-be-verified dynamic code is different from the random dynamic code.

In an embodiment, a token storage component is run on the terminal device. The process of sending an identity certification reply to the certification server according to the initial identity certification request may be: invoking the token storage component according to the initial identity certification request to generate a to-be-verified dynamic password according to a token key, and taking the to-be-verified dynamic password as the identity certification reply; and sending the to-be-verified dynamic password to the certification server, so that the certification server compares the to-be-verified dynamic password with a target dynamic password and determines an initial identity certification result according to a comparison result. The target dynamic password is generated by the certification server according to a target token key associated with the user identity information in the user information management library. The initial identity certification result is an initial identity certification success result in response to the comparison result indicating that the to-be-verified dynamic password is the same as the target dynamic password. The initial identity certification result is an initial identity certification failure result in response to the comparison result indicating that the to-be-verified dynamic password is different from the target dynamic password.

The method provided in embodiments of this disclosure can prevent an identity certificate credit root of a target user from being leaked by using an unreadable private key. A security certification component subsequently intercepts a service access request initiated by a service application, obtains to-be-verified identity information in the service access request, and initiates an identity certification request carrying the to-be-verified identity information to a certification server. Then random challenge information sent by the certification server is received when the certification server determines that the to-be-verified identity information is valid. The public and private key storage component is invoked to sign the random challenge information through a private key to obtain to-be-verified signature information, and waits for the certification server to perform, based on the random challenge information and a public key of the target user, signature verification. With the method provided by the embodiments of this disclosure, it can be ensured that the to-be-verified signature information is different, and the private key generating the to-be-verified signature information is not leaked, so that an attacker cannot steal the identity of a user, thereby improving the security of a zero-trust system in terms of identity information.

FIG. 6 is a schematic flowchart of another access control method according to an embodiment of this disclosure. The method is performed by the certification server 100 in FIG. 1. As shown in FIG. 6, the access control process may include the following steps:

In step S201, perform, by a certification server in response to an identity certification request issued by a terminal device and carrying to-be-verified identity information of a target user, validity verification on the to-be-verified identity information. In an example, an identity validation request that includes identify information of a user is received from a user device, and a determination is made as to determining whether the identity information is valid.

In an example, after receiving the identity certification request carrying the to-be-verified identity information of the target user, the certification server may first determine whether the to-be-verified identity information is valid, namely, whether the target user completes user registration. A user information management library is stored in the certification server. When the user completes the foregoing user registration, the certification server may bind user identity information of the user with a public key certificate and store the user identity information and the public key certificate in the user information management library. Therefore, the process of performing, by a certification server in response to an identity certification request issued by a security certification component and carrying to-be-verified identity information of a target user, validity verification on the to-be-verified identity information may be: searching, by the certification server, for the to-be-verified identity information of the target user in the user information management library in response to the identity certification request issued by the security certification component and carrying the to-be-verified identity information of the target user; if user identity information which is the same as the to-be-verified identity information of the target user is found in the user information management library, determining that the to-be-verified identity information of the target user is valid information; and if the user identity information which is the same as the to-be-verified identity information of the target user is not found in the user information management library, determining that the to-be-verified identity information of the target user is invalid information, and issuing identity verification failure prompt information to the terminal device. The identity verification failure prompt information may be prompt information indicating that "a user has not registered".

In step S202, send, by the certification server, random challenge information to the security certification component in a case that the to-be-verified identity information is determined to be valid information, so that the security certification component obtains to-be-verified signature information obtained by signing the random challenge information through a private key, the private key being unreadable. In an example, challenge information is sent to the user device based on the identity information being determined to be valid.

In an example, the random challenge information is randomly generated by the certification server according to a correlation function or method. In other words, the random challenge information is different in each identity certification process. The random challenge information may include a random number, a random string, random text, and the like.

For an example of the process of obtaining, by the security certification component, to-be-verified signature information after receiving the random challenge information, reference may be made to step S103.

In step S203, receive, by the certification server, the to-be-verified signature information sent by the security certification component, and perform, based on the random challenge information and a public key certificate bound with the to-be-verified identity information, signature verification on the to-be-verified signature information to obtain a signature verification result. In an example, signature information of the challenge information that is generated based on the challenge information and a private key is received from the user device. A determination is made as to whether the challenge information is obtained from the signature information with a public key associated with the identity information.

In an example, the process of receiving the to-be-verified signature information sent by the security certification component and performing, based on the random challenge information and a public key certificate bound with the to-be-verified identity information, signature verification processing on the to-be-verified signature information to obtain a signature verification result may be: receiving the to-be-verified signature information sent by the security certification component; then obtaining the public key certificate bound with the to-be-verified identity information of the target user in the user information management library, and determining a public key of the target user according to the public key certificate, where for example, the user identity information and the public key certificate of the user are stored in the user information management library, the certification server determines the user identity information matching the to-be-verified identity information in the user information management library, and then the public key certificate corresponding to the user identity information is the public key certificate bound with the to-be-verified identity information; and performing, based on the public key of the target user and the random challenge information, signature verification on the to-be-verified signature information to obtain the signature verification result. The public key certificate is an electronic file containing an owner of the public key and information related to the public key, and may be used for proving the real identity of a digital certificate holder. After obtaining the public key certificate bound with the to-be-verified identity information, the certification server may determine, according to the relevant information on the public key certificate, that the public key in the public key certificate belongs to the target user, and directly obtain the public key of the target user from the public key certificate.

In an example, the process of performing, based on the public key of the target user and the random challenge information, signature verification on the to-be-verified signature information to obtain the signature verification result may be: decrypting, based on the public key of the target user, the to-be-verified signature information to obtain a digital digest; performing a hash operation on the random challenge information to obtain a real digital digest of the random challenge information; determining that the signature verification result is a signature verification success result in response to the digital digest being the same as the real digital digest; and determining that the signature verification result is a signature verification failure result in response to the digital digest being different from the real digital digest, and issuing identity verification failure prompt information to the security certification component. It is to be explained that the hash algorithm used by the certification server for the random challenge information is required to be the same as the hash algorithm used by the public and private key storage component for the random challenge information.

In step S204, issue, by the certification server, a signature verification success message to the security certification component in response to the signature verification result being a signature verification success result, so that the security certification component sends, based on the signature verification success message, a service access request to the certification server. In an example, a signature valid message is sent to the user device based on the challenge information being obtained from the signature information with the public key.

In an example, the signature verification means that the public key obtained by the certification server matches the private key of the target user. The service access request of the target user is valid. The certification server may issue a signature verification success message, namely, issue a message instruction allowing the target user to access the internal resource. After receiving the signature verification success message, the security certification component may forward the service access request to the certification server.

In step S205, forward, by the certification server, the service access request to the service server accessed by a service application. In an example, a service access request is received from the user device based on the signature valid message.

In an example, the certification server may forward the service access request to the certification server accessed by the service application, so that the target user may normally access the internal resources.

In the method provided by the embodiments of this disclosure, after determining that to-be-verified identity information of a target user is valid, a certification server may generate random challenge information and issue the random challenge information to a security certification component, and then wait for the security certification component to perform private key signature on the random challenge information to obtain to-be-verified signature information. Then the certification server may obtain a public key certificate of the target user so as to obtain a public key of the target user to perform signature verification on the to-be-verified signature information, so as to complete the identity certification of the target user. Due to the uncertainty of the random challenge information, the to-be-verified signature information sent by the security certification component at each time is uncertain. Even if the to-be-verified signature information at a certain time is leaked, the to-be-verified signature information is unavailable at next time, thereby preventing an identity cloning attack.

Further, the above-mentioned user needs to complete user registration first, so that the user identity information and the public key certificate of the user exist in the user information management library in the certification server, and the access control method can be normally performed. For ease of understanding, reference may be made to FIG. 7. FIG. 7 is a schematic flowchart of a user registration method according to an embodiment of this disclosure. The method may be performed by the certification server 100 shown in FIG. 1. As shown in FIG. 7, the access control process may include the following steps:

In step S301, receive, by a certification server, a user registration request sent by a security certification component for a target user, the user registration request including a public key of the target user and user identity information of the target user.

In an example, if the target user wants to access an internal resource at any position, a zero-trust client (including the security certification component) may be integrally installed in a terminal device. Then a service access request of the target user for an internal resource may be forwarded to a service server through the certification server after data interaction between the security certification component, a public and private key storage component corresponding to the zero-trust client and the certification server completes the identity certification of the target user. In the foregoing identity certification process of the target user, the public key certificate and user identity information of the target user are required. However, when the target user accesses the internal resource for the first time, there is no relevant user identity information and public key certificate in the certification server. Therefore, it is required to first send a user registration request to the certification server through the zero-trust client so as to complete the registration of the user identity information and the public key certificate in a user information management library.

In step S302, send, to the security certification component, an initial identity certification request initiated based on the user registration request, receive an identity certification reply sent by the security certification component according to the initial identity certification request, and perform initial identity certification according to the identity certification reply to obtain an initial identity certification result.

In an example, the user information management library may contain a list of internal users, i.e. a list of users allowed to access the internal resource. It is to be understood that only certain groups of people may have access to the internal resource since the internal resource is not a public access resource, such as an internal resource of a company. Certain users such as only company employees and company-related customers may be allowed access. A resource manager may update the list of internal users in the user information management library according to the personnel change and business Transaction. It is to be explained that users in the list of internal users include registered users and unregistered users. If the users in the list of internal users do not complete user registration, the identity certification cannot be completed, and the internal resource cannot be accessed. The list of internal users contains user initial identity information and registration information. The registration information may be contact account, contact phone number, contact mailbox, token key, and another information for assisting the user to complete user registration.

In an embodiment, when the registration information is a contact account, after receiving the initial identity certification request, the certification server queries a contact account bound with the user initial identity information corresponding to the user identity information in the user information management library, and then sends a random dynamic code to the contact account. The operation of sending, to the security certification component, an initial identity certification request initiated based on the user registration request, receiving an identity certification reply sent by the security certification component according to the initial identity certification request, and performing initial identity certification according to the identity certification reply to obtain an initial identity certification result may be: sending, to the security certification component, an initial identity certification request initiated based on the user registration request, so that the security certification component displays a dynamic code certification interface (the dynamic code certification interface 13 in the embodiment corresponding to FIG. 4) according to the initial identity certification request, and the security certification component obtains a to-be-verified dynamic code in response to receiving an input determination operation on the dynamic code certification interface, and takes the to-be-verified dynamic code as the identity certification reply; receiving, by the certification server, the to-be-verified dynamic code sent by the security certification component, and comparing the to-be-verified dynamic code with a random dynamic code; determining that the initial identity certification result is an initial identity certification success result in response to the to-be-verified dynamic code being the same as the random dynamic code; and determining that the initial identity certification result is an initial identity certification failure result in response to the to-be-verified dynamic code being different from the random dynamic code. It is to be understood that if the target user is a valid user, the random dynamic code issued by the certification server can be obtained by the contact account, and then the received random dynamic code may be inputted through the dynamic code certification interface. The to-be-verified dynamic code obtained by the security certification component must be the same as the random dynamic code.

In an embodiment, when the registration information is a token key, the operation of sending, by the certification server to the security certification component, an initial identity certification request initiated based on the user registration request, receiving an identity certification reply sent by the security certification component according to the initial identity certification request, and performing initial identity certification according to the identity certification reply to obtain an initial identity certification result may be: sending, by the certification server to the security certification component, an initial identity certification request initiated based on the user registration request, so that the security certification component generates, according to the initial identity certification request, a to-be-verified dynamic password in a token storage component according to a token key; receiving the to-be-verified dynamic password sent by the security certification component; obtaining a target token key associated with the user identity information in the user management information library, and generating a target dynamic password according to the target token key; determining that the initial identity certification result is an initial identity certification success result in response to the to-be-verified dynamic password being the same as the target dynamic password; and determining that the initial identity certification result is an initial identity certification failure result in response to the to-be-verified dynamic password being different from the target dynamic password.

In step S303, generate, by the certification server, the public key certificate according to the public key and basic certificate information in response to the identity certification result being determined to be an identity certification success result.

In an example, the public key certificate of the target user records personal information such as a name, organization, mailbox address, etc. of the target user, and a public key belonging to the target user, and needs to be digitally signed by a certification authority (certifying authority, CA). When the certification server obtains the public key certificate of the target user, it may be considered that the public key therein belongs to the target user, and the public key certificate may be simply referred to as a certificate. The CA may be understood as a trusted third party, and the certification server and the terminal device both accept the public key certificate generated by the CA, which may be used for determining that "the public key actually belongs to the target user", and signing with the private key thereof. The CA function may be implemented by a certificate issuing component. The certificate issuing component may be internal to the certification server or external to a dedicated CA server. The certification server may communicate with the CA server to indirectly invoke the certificate issuing component to generate the public key certificate of the target user.

In step S304, bind, by the certification server, the public key certificate with the user identity information, store the public key certificate and the user identity information, bound together, into the user information management library, and issue the public key certificate to the security certification component, so that the terminal device stores the public key certificate.

In an example, after obtaining the public key certificate through the certificate issuing component, the certification server may bind the public key certificate with the user identity information, and then store the public key certificate and the user identity information, bound together, into the user information management library, so as to facilitate management and query. And the certification server also issues the public key certificate to the security certification component, and the security certification component writes the public key certificate into the public and private key storage component, so that the public and private key storage component stores the public key certificate, which is convenient for the terminal device to perform query and management.

With the method provided by the embodiments of this disclosure, only a user in a list of internal users can complete user registration, and the foregoing identity certification process for accessing an internal resource can be performed subsequently.

Figure 8:
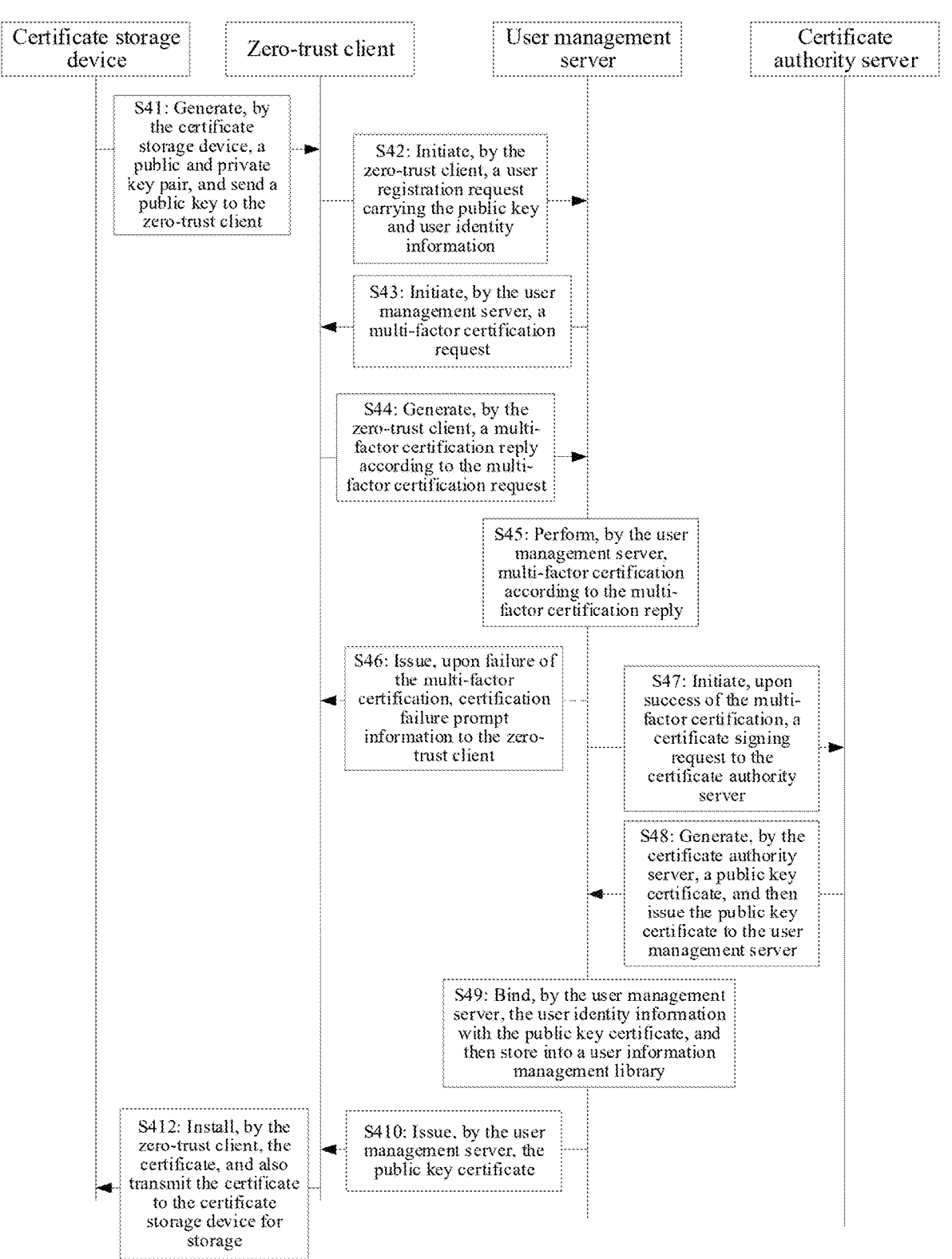
FIG. 8 is a schematic timing diagram of a user registration process according to an embodiment of this disclosure.

FIG. 8 is a schematic timing diagram of a user registration process according to an embodiment of this disclosure. The user registration process refers to a registration process when a user uses a zero-trust system for the first time. The user registration process involves four subjects: a certificate storage device, a zero-trust client, a user management server, and a CA server. The certificate storage device is the foregoing public and private key storage component, and the zero-trust client is the foregoing target application including the security certification component (namely, the target application 12 shown in FIG. 2). In order to better illustrate the generation of a public key certificate, it is assumed that the foregoing certificate issuing component individually corresponds to a CA server, and the functions realized by the remaining certification servers are realized by the user management server. In other words, the CA server and the user management server may be independent servers, and may also be integrated into one server, namely, the foregoing certification server. The exemplary user registration process is described as follows:

In step S41, generate, by a certificate storage device (public and private key storage component), a public and private key pair, and send a public key to a zero-trust client (security certification component).

In an example, the certificate storage device generates the public and private key pair therein and sends the public key to the zero-trust client installed on the terminal device. The private key always depends on the certificate storage device, and as mentioned above, the certificate storage device has an unreadable characteristic. Therefore, the private key cannot be derived. The generation of the public and private key pair may be based on asymmetric cryptographic methods such as RSA (an asymmetric key encryption technology), a digital signature algorithm (DSA), an elliptic curve digital signature algorithm (ECDSA), or other zero-knowledge proof algorithms.

In step S42, initiate, by the zero-trust client, a user registration request carrying the public key and user identity information.

In an example, the zero-trust client sends the user registration request to the user management server. The requested data mainly includes the public key and the necessary user identity information.

In step S43, initiate, by the user management server, a multi-factor certification request (the foregoing initial identity certification request).

In an example, after receiving the user registration request sent by the zero-trust client, the user management server may actively initiate the multi-factor certification request to the user. Common multi-factor certification modes include: a mobile phone short message dynamic certification code, a mobile phone application QR code scanning certification, a dynamic token, and the like. It is to be explained that the user management server actively initiating the multi-factor certification to the user is an abstract and omitted statement, which is to unify the expression forms under different implementation modes, and mainly emphasizes that the multi-factor certification action is controlled and initiated by the user management server. When a next user request arrives, the user management server first checks the multi-factor certification state. If it has not been certificated, the user management server issues multi-factor certification information (short messages, QR codes, dynamic tokens, and the like), and waits for a reply.

In step S44, generate, by the zero-trust client, a multi-factor certification reply according to the multi-factor certification request.

In an example, after receiving the multi-factor certification information issued by the user management server, the user replies with a corresponding multi-factor certification reply (such as a short message verification code, a QR code scanning result, and dynamic token information) to the user management server through the zero-trust client according to a specific multi-factor certification mode.

In step S45, perform, by the user management server, multi-factor certification according to the multi-factor certification reply.

In an example, after receiving the multi-factor certification reply information sent by the zero-trust client, the user management server may determine the multi-factor certification result according to different multi-factor certification modes. For an exemplary implementation, reference may be made to the relevant description about step S302 in the embodiment corresponding to FIG. 7. Details are not described herein again.

In step S46, issue, upon failure of the multi-factor certification, certification failure prompt information to the zero-trust client.

In an example, if the user management server determines that the multi-factor certification fails, the certification failure prompt information may be directly returned to inform the user of the registration failure.

In step S47, initiate, upon success of the multi-factor certification, a certificate signing request (CSR) to the CA server.

In an example, if the user management server determines that the multi-factor certification is successful, the user management server sends the CSR to the CA server. The CSR includes the public key and other basic information required for the certificate.

In step S48, generate, by the CA server, a public key certificate, and then issue the public key certificate to the user management server.

In an example, the CA server may obtain the public key and other basic information required for the certificate from the CSR request, generate an initial certificate, use a stored certificate private key to sign the initial certificate to obtain the public key certificate, and then issue the public key certificate to the user management server.

In step S49, bind, by the user management server, the user identity information with the public key certificate, and then store into a user information management library.

In an example, the user management server binds the user identity information with the public key certificate using a user ID and a fingerprint of the certificate, and stores into the user information management library. The fingerprint of the certificate means that the certificate has a unique identification code.

In step S410, issue, by the user management server, the public key certificate to the zero-trust client, and in step S412 install, by the zero-trust client, the certificate, and also transmit the certificate to the certificate storage device for storage.

With the method provided by embodiments of this disclosure, an internal user can quickly complete user registration while it is ensured that a non-internal user cannot complete the user registration.

Figure 9:
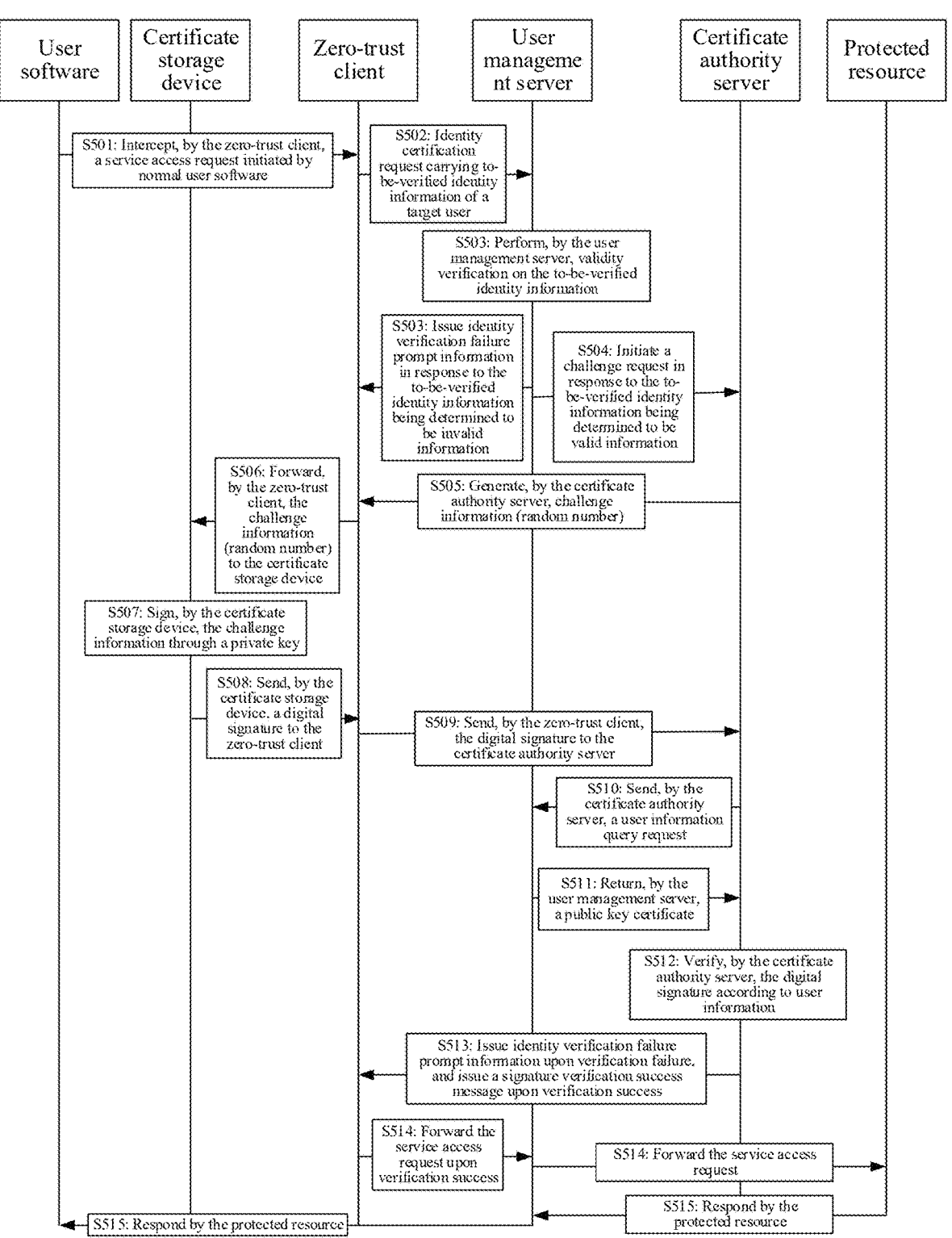
FIG. 9 is a schematic timing diagram of a user certification process according to an embodiment of this disclosure.

FIG. 9 is a schematic timing diagram of a user certification process according to an embodiment of this disclosure. After the user successfully completes the user registration process when using the zero-trust system for the first time as shown in FIG. 8, the zero-trust client may be used in cooperation with the certificate storage device to perform zero-trust certification during subsequent use, thereby facilitating access to protected Intranet resources. The user certification process has two more subjects than the foregoing user registration process: user software and protected resources. User software refers to software used by the user that needs zero-trust certification, and the user needs to access the internal protected resources through these software. For B/S architecture software, user software may refer to a browser. For C/S architecture software, user software may refer to specific client software. The protected resources may refer to a service end of software, and these services are placed on an Intranet or a cloud end, and need to perform personal identity certification on an access request, so that resources behind the services can be protected to be accessed only by valid users. The exemplary user certification process is described as follows:

In step S501, intercept, by the zero-trust client, a service access request initiated by normal user software.

In an example, a user (namely, the foregoing target user) normally uses software (namely, the foregoing service application) to access a protected resource (namely, the foregoing internal resource), and the service access request may be intercepted by the zero-trust client. The zero-trust client may intercept the service access request by means of a full traffic proxy of a virtual network card, which is simply that all requests of a terminal device pass through the zero-trust client, and the zero-trust client may identify the request and intercept the service access request for accessing the protected resource.

In step S502, initiate, by the zero-trust client, an identity certification request carrying to-be-verified identity information of a target user.

In an example, after intercepting the service access request, the zero-trust client may initiate a user certification process and send the identity certification request carrying the to-be-verified identity information to the user management server.

In step S503, perform, by the user management server, validity verification on the to-be-verified identity information, and issue identity verification failure prompt information if determining that the to-be-verified identity information is invalid information.

In an example, the user management server searches for user information which is the same as the to-be-verified identity information in a user information management library, and checks the user information. If the user information check fails, that is, the same user information is not found in the user information management library, it is determined that the to-be-verified identity information is invalid information, and a user certification failure message may be directly returned to the zero-trust client.

In step S504, initiate a challenge request if the user management server determines that the to-be-verified identity information is valid information In an example, since a certificate issuing component is placed on a CA server, the foregoing processes of generating random challenge information and performing signature verification processing on to-be-verified signature information may also be implemented by the CA server. At this moment, the user management server may first initiate a challenge request to the CA server.

In step S505, generate, by the CA server, challenge information (random number).

In an example, after receiving the challenge request, the CA server may send challenge information (namely, the foregoing random challenge information) to the zero-trust client, and actual information of a challenge message may be a random number.

In step S506, forward, by the zero-trust client, the challenge information (random number) to the certificate storage device.

In an example, the zero-trust client forwards the challenge information to the certificate storage device, initiates a challenge response process, and then performs a digital certificate signature operation inside the certificate storage device.

In step S507, sign, by the certificate storage device, the challenge information through a private key.

In an example, the certificate storage device has an operation capability, and after receiving a random challenge, a digital signature operation is performed on the challenge message inside the device. The essence thereof is to perform an encryption operation on the random number of the challenge message using the private key stored inside the device.

In step S508, send, by the certificate storage device, a digital signature to the zero-trust client.

In an example, the certificate storage device sends a digital signature of the calculated random challenge (namely, the foregoing to-be-verified signature information) to the zero-trust client.

In step S509, send, by the zero-trust client, the digital signature to the CA server.

In step S510, send, by the CA server, a user information query request.

In an example, the user information query request includes user information of the user.

In step S511, return, by the user management server, a public key certificate.

In an example, the user management server searches for the public key certificate bound with the user information in the user information management library, and then returns the public key certificate to the CA server.

In step S512, verify, by the CA server, the digital signature according to user information.

In an example, the CA server performs a digital signature verification process. The specific operation is to decrypt the digital signature using the certificate public key, and then compare the decrypted message with the challenge information sent in step S505. If yes, the verification is successful, and if no, the verification fails.

In step S513, issue identity verification failure prompt information upon verification failure, and issue a signature verification success message upon verification success.

In an example, if the verification fails, the CA server may return a digital signature verification failure message to the zero-trust client. At this moment, the certification fails, and the service access request of the normal user software is terminated. If the verification is successful, the CA server may return a digital signature verification success message to the zero-trust client. At this moment, the certification of the user is successful.

In step S514, forward, by the zero-trust client, the service access request to the user management server upon verification success, and forward, by the user management server, the service access request to the protected resource.

In step S515, respond by the protected resource.

With the method provided by embodiments of this disclosure, when a user accesses a protected resource through normal user software, a challenge certification of a CA server needs to be performed first. After the challenge certification is successful, a service access request is forwarded to a user management server, and then the user management server forwards the request to the protected resource. Since a private key of a terminal device is not derivable, an attacker cannot generate a digital signature required for the challenge certification by stealing the private key, and therefore the identity of a user cannot be stolen, thereby avoiding an identity cloning attack.

Figure 10:
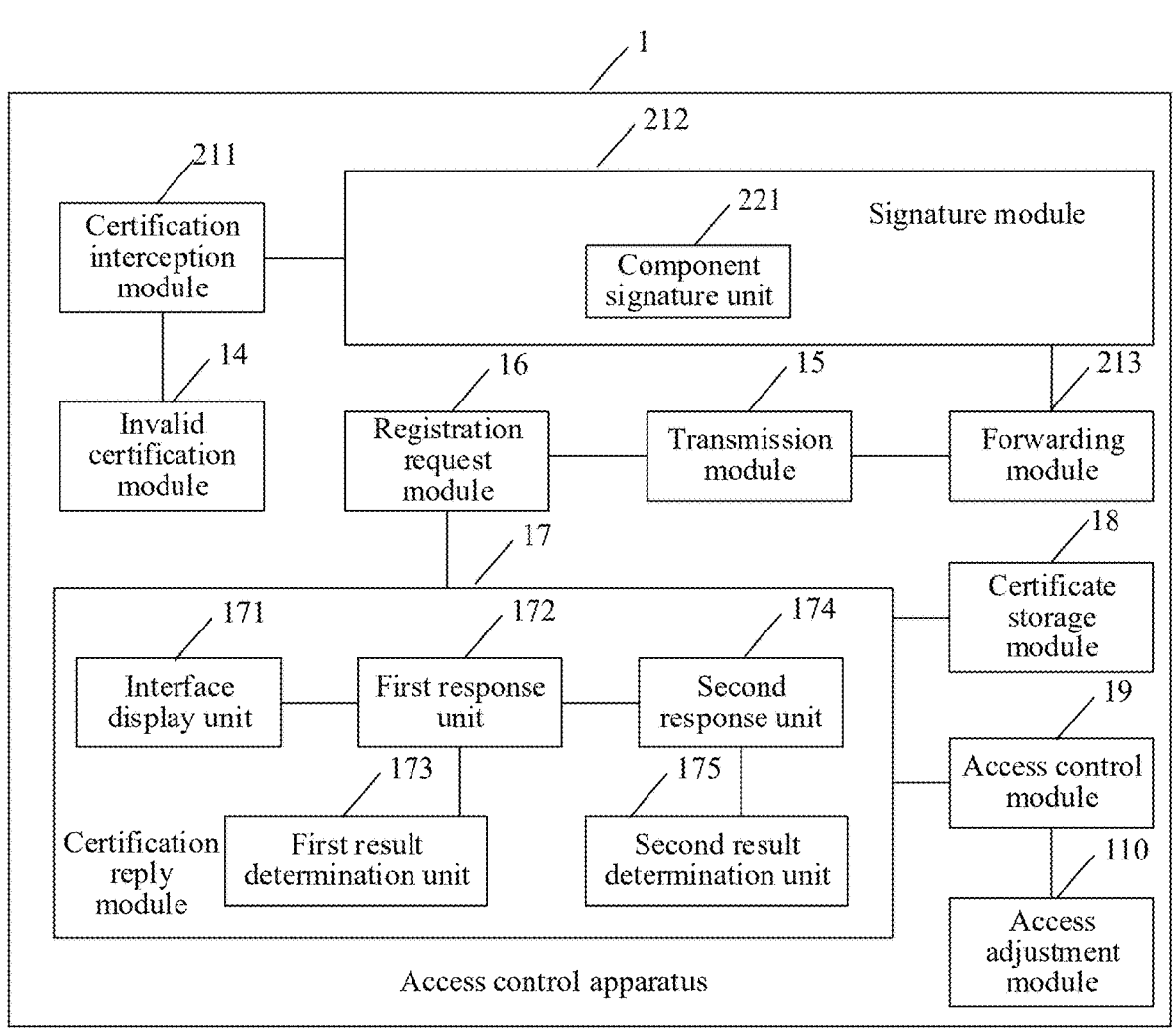
FIG. 10 is a schematic structural diagram of an access control apparatus according to an embodiment of this disclosure.

FIG. 10 is a schematic structural diagram of an access control apparatus based on zero-trust security according to an embodiment of this disclosure. The access control apparatus may be a computer program (including a program code) run on a computer device. For example, the access control apparatus is application software. The apparatus may be configured to perform the corresponding steps in the method provided in the embodiments of this disclosure. As shown in FIG. 10, the access control apparatus 1 may include a certification interception module 211, a signature module 212 and a forwarding module 213. One or more modules, submodules, and/or units of the apparatus can be implemented by processing circuitry, software, or a combination thereof, for example.

The certification interception module 211 is configured to intercept a service access request initiated by a service application. The service access request includes to-be-verified identity information of a target user.

The certification interception module 211 is further configured to obtain the to-be-verified identity information in the service access request.

The forwarding module 213 is configured to initiate an identity certification request carrying the to-be-verified identity information to a certification server, so that the certification server sends random challenge information to a security certification component in a case that the to-be-verified identity information is determined to be valid information.

The signature module 212 is configured to obtain to-be-verified signature information obtained by signing the random challenge information through a private key. The private key is unreadable.

The forwarding module 213 is configured to send the to-be-verified signature information to the certification server, so that the certification server performs, based on the random challenge information and a public key certificate bound with the to-be-verified identity information, signature verification on the to-be-verified signature information to obtain a signature verification result.

The receiving module is configured to receive a signature verification success message issued by the certification server in response to the signature verification result being a signature verification success result.

The forwarding module 213 is configured to send, based on the signature verification success message, the service access request to the certification server, so that the certification server forwards the service access request to a service server accessed by the service application.

For an exemplary implementation of the certification interception module 211, a signature module 212 and a forwarding module 213, reference may be made to the description about step S101 to step S105 in the embodiment corresponding to FIG. 5. Details are not described herein again.

Referring to FIG. 10, the signature module 212 may include a component signature unit 221.

The component signature unit 221 is configured to transmit the random challenge information to a public and private key storage component. The public and private key storage component is configured to sign the random challenge information through a private key in the public and private key storage component to obtain the to-be-verified signature information. The public and private key storage component has a data-unreadable attribute.

The component signature unit 221 is configured to obtain the to-be-verified signature information transmitted by the public and private key storage component.

The public and private key storage component is configured to perform a hash operation on the random challenge information to obtain a digital digest of the random challenge information, and perform asymmetric encryption processing on the digital digest through the private key to obtain to-be-verified signature information for the random challenge information.

The public and private key storage component is a hardware device for connection with a terminal device, or the public and private key storage component is a hardware device within the terminal device, or the public and private key storage component is a software system run on the terminal device.

For an exemplary implementation of the component signature unit 221, reference may be made to the description about step S103 in the embodiment corresponding to FIG. 5. Details are not described herein again.

The to-be-verified identity information of the target user, belonging to valid information, exists in a user information management library in the certification server. The to-be-verified identity information of the target user, belonging to invalid information, does not exist in the user information management library in the certification server.

Referring to FIG. 10, the access control apparatus 1 may further include:

an invalid certification module 14, configured to receive identity verification failure prompt information sent by the certification server in response to the certification server determining that the to-be-verified identity information is the invalid information.

For an exemplary implementation of the invalid certification module 14, reference may be made to the description about step S103 in the embodiment corresponding to FIG. 5. Details are not described herein again.

Referring to FIG. 10, the access control apparatus 1 may further include a transmission module 15, a registration request module 16, a certification reply module 17, and a certificate storage module 18.

The public and private key storage component is configured to generate a public and private key pair of the target user. The public and private key pair includes the private key and a public key.

The transmission module 15 is configured to receive the public key transmitted by the public and private key storage component.

The registration request module 16 is configured to send a user registration request for the target user to the certification server. The user registration request includes the public key of the target user and user identity information of the target user.

The registration request module 16 is further configured to receive an initial identity certification request issued by the certification server based on the user registration request.

The certification reply module 17 is configured to send an identity certification reply to the certification server according to the initial identity certification request, so that the certification server performs initial identity certification according to the identity certification reply to obtain an initial identity certification result.

The certificate storage module 18 is further configured to receive the public key certificate issued by the certification server in response to the initial identity certification result being an initial identity certification success result.

The transmission module 15 is configured to transmit the public key certificate to the public and private key storage component. The public and private key storage component is configured to store the public key certificate.

For an exemplary implementation of the transmission module 15, the registration request module 16, the certification reply module 17, and the certificate storage module 18, reference may be made to the exemplary description about step S105 in the embodiment corresponding to FIG. 5. Details are not described herein again.

In an embodiment, the identity certification reply includes a to-be-verified dynamic code.

Referring to FIG. 10, the certification reply module 17 may include an interface display unit 171, a first response unit 172 and a first result determination unit 173.

The interface display unit 171 is configured to display a dynamic code certification interface according to the initial identity certification request. The dynamic code certification interface is used for inputting the to-be-verified dynamic code.

The first response unit 172 is configured to obtain the to-be-verified dynamic code in response to receiving an input determination operation on the dynamic code certification interface.

The first result determination unit 173 is configured to send the to-be-verified dynamic code to the certification server, so that the certification server compares the to-be-verified dynamic code with a random dynamic code, and determines an initial identity certification result according to a comparison result. The random dynamic code is sent by the certification server to a contact account. The contact account has a binding relationship with the target user in a user information management library of the certification server.

The initial identity certification result is an initial identity certification success result in response to the comparison result indicating that the to-be-verified dynamic code is the same as the random dynamic code. The initial identity certification result is an initial identity certification failure result in response to the comparison result indicating that the to-be-verified dynamic code is different from the random dynamic code.

For an exemplary implementation of the interface display unit 171, the first response unit 172 and the first result determination unit 173, reference may be made to the exemplary description about step S105 in the embodiment corresponding to FIG. 5. Details are not described herein again.

In an embodiment, the identity certification reply includes a to-be-verified dynamic password.

Referring to FIG. 10, the certification reply module 17 may include a second response unit 174 and a second result determination unit 175.

The second response unit 174 is configured to invoke a token storage component according to the initial identity certification request to generate the to-be-verified dynamic password according to a token key.

The second result determination unit 175 is configured to send the to-be-verified dynamic password to the certification server, so that the certification server compares the to-be-verified dynamic password with a target dynamic password and determines an initial identity certification result according to a comparison result. The target dynamic password is generated by the certification server according to a target token key associated with the user identity information in a user information management library. The initial identity certification result is an initial identity certification success result in response to the comparison result indicating that the to-be-verified dynamic password is the same as the target dynamic password. The initial identity certification result is an initial identity certification failure result in response to the comparison result indicating that the to-be-verified dynamic password is different from the target dynamic password.

For an exemplary implementation of the second response unit 174 and the second result determination unit 175, reference may be made to the exemplary description about step S105 in the embodiment corresponding to FIG. 5. Details are not described herein again.

Referring to FIG. 10, the access control apparatus 1 may further include an access control module 19.

The access control module 19 is configured to query an access state of the target user.

The access control module 19 is further configured to send, by the security certification component, the service access request to the certification server in response to the access state being an allowed access state, so that the certification server forwards the service access request to the service server accessed by the service application.

The access control module 19 is further configured to perform the operation of obtaining, by the security certification component, the to-be-verified identity information in the service access request and initiating an identity certification request carrying the to-be-verified identity information to a certification server in response to the access state being an unknown access state.

For an exemplary implementation of the access control module 19, reference may be made to the exemplary description about step S105 in the embodiment corresponding to FIG. 5. Details are not described herein again.

Referring to FIG. 10, the access control apparatus 1 may further include an access adjustment module 110.

The access adjustment module 110 is configured to receive a state adjustment instruction sent by the certification server in a case that the signature verification success message issued by the certification server is received, and adjust the access state of the target user into the allowed access state according to the state adjustment instruction.

The access adjustment module 110 is further configured to set an allowed access validity period for the access state of the target user.

The access adjustment module 110 is further configured to adjust the access state of the target user into the unknown access state in a case that current accumulated duration in which the access state of the target user is the allowed access state exceeds the allowed access validity period.

For an exemplary implementation of the access control module 110, reference may be made to the exemplary description about step S105 in the embodiment corresponding to FIG. 5. Details are not described herein again.

Figures 11, 12:
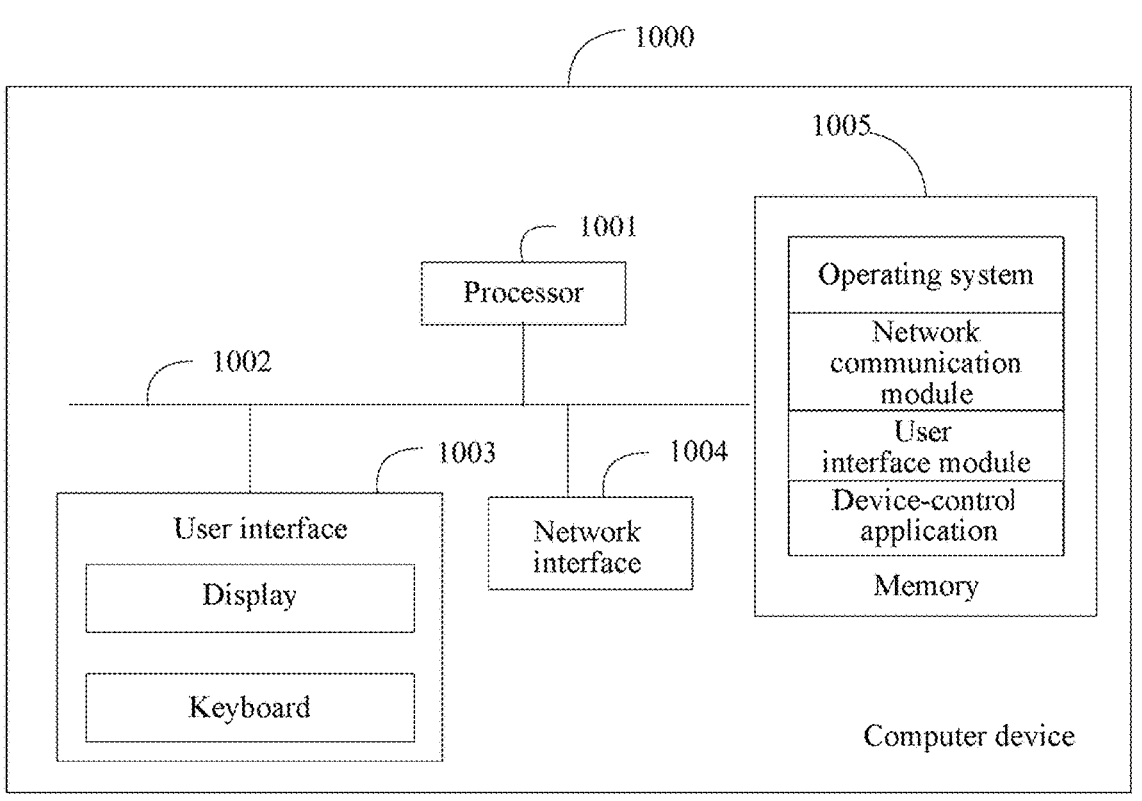
FIG. 11 is a schematic structural diagram of a computer device according to an embodiment of this disclosure.
FIG. 12 is a schematic structural diagram of another access control apparatus according to an embodiment of this disclosure.

Further, reference is made to FIG. 11. FIG. 11 is a schematic structural diagram of a computer device according to an embodiment of this disclosure. As shown in FIG. 11, the access control apparatus 1 in the embodiment corresponding to FIG. 10 may be applied to the computing device 1000. The computing device 1000 may include processing circuitry (such as a processor 1001), a network interface 1004 and a memory 1005. In addition, the computing device 1000 may further include a user interface 1003 and at least one communication bus 1002. The communication bus 1002 is configured to implement connection and communication between the components. The user interface 1003 may include a display, a keyboard. The user interface 1003 may include a display, a keyboard. The user interface 1003 may further include a wired interface and a wireless interface. The network interface 1004 may include a wired interface and a wireless interface (such as a WI-FI interface). The memory 1005 may be a high-speed random access memory (RAM), or may be a non-volatile memory, for example, at least one magnetic disk memory. The memory 1005 may be at least one storage apparatus that is located far away from the foregoing processor 1001. As shown in FIG. 11, the memory 1005 used as a computer-readable storage medium may include an operating system, a network communication module, a user interface module, and a device-control application.

In the computer device 1000 shown in FIG. 11, the network interface 1004 may be configured to provide a network communication function. The user interface 1003 is mainly configured to provide an input interface for a user. The processor 1001 may be configured to invoke the device-control application stored in the memory 1005, to implement the following operations:

intercepting a service access request initiated by a service application, the service access request including to-be-verified identity information of a target user;

obtaining the to-be-verified identity information in the service access request, and initiating an identity certification request carrying the to-be-verified identity information to a certification server, so that the certification server sends random challenge information to the security certification component in a case that the to-be-verified identity information is determined to be valid information;

obtaining to-be-verified signature information obtained by signing the random challenge information through a private key, the private key being unreadable;

sending the to-be-verified signature information to the certification server, so that the certification server performs, based on the random challenge information and a public key certificate bound with the to-be-verified identity information, signature verification on the to-be-verified signature information to obtain a signature verification result; and receiving a signature verification success message issued by the certification server in response to the signature verification result being a signature verification success result, and sending, based on the signature verification success message, the service access request to the certification server, so that the certification server forwards the service access request to a service server accessed by the service application.

It is to be understood that, the computer device 1000 described in this embodiment of this disclosure may implement the descriptions of the access control method in the foregoing embodiments, or the descriptions of the access control apparatus 1 in the embodiment corresponding to FIG. 10. Details are not described herein again. In addition, the descriptions of beneficial effects of the same method are not described herein again.

In addition, an embodiment of this disclosure further provides a computer-readable storage medium, such as a non-transitory computer-readable storage medium, and the computer-readable storage medium stores the computer program executed by the access control apparatus 1 mentioned above. When loading and executing the computer program, the processor may perform the descriptions of the access control method in any of the foregoing embodiments. Therefore, details are not described herein again. In addition, the descriptions of beneficial effects of the same method are not described herein again. For exemplary technical details that are not disclosed in the embodiments of the computer-readable storage medium involved in this disclosure, reference is made to the descriptions of the method embodiments of this disclosure.

Further, reference is made to FIG. 12. FIG. 12 is a schematic structural diagram of another access control apparatus based on zero-trust security according to an embodiment of this disclosure. The data processing apparatus may be a computer program (including a program code) run on a computer device. For example, the access control apparatus is application software. The apparatus may be configured to perform the corresponding steps in the method provided in the foregoing embodiment of this disclosure. As shown in FIG. 12, the access control apparatus 2 may include an identity certification module 21, a challenge sending module 22, a signature verification module 23, and a service processing module 24. One or more modules, submodules, and/or units of the apparatus can be implemented by processing circuitry, software, or a combination thereof, for example.

The identity verification module 21 is configured to perform, in response to an identity certification request issued by a security certification component and carrying to-be-verified identity information of a target user, validity verification on the to-be-verified identity information.

The challenge sending module 22 is configured to send random challenge information to the security certification component in a case that the to-be-verified identity information is determined to be valid information, so that the security certification component obtains to-be-verified signature information obtained by signing the random challenge information through a private key. The private key is unreadable.

The signature verification module 23 is configured to receive the to-be-verified signature information sent by the security certification component, and perform, based on the random challenge information and a public key certificate bound with the to-be-verified identity information, signature verification on the to-be-verified signature information to obtain a signature verification result.

The service processing module 24 is configured to: issue a signature verification success message to the security certification component in response to the signature verification result being a signature verification success result, so that the security certification component sends, based on the signature verification success message, a service access request to the certification server; and forward the service access request to a service server accessed by a service application.

For an exemplary implementation of the identity certification module 21, the challenge sending module 22, the signature verification module 23, and the service processing module 24, reference may be made to the description about step S201 to step S205 in the embodiment corresponding to FIG. 6. Details are not described herein again.

Referring to FIG. 12, the signature verification module 23 may include a receiving unit 231, a public key obtaining unit 232 and a signature verification unit 233.

The receiving unit 231 is configured to receive the to-be-verified signature information sent by the security certification component.

The public key obtaining unit 232 is configured to obtain, from a user information management library, the public key certificate bound with the to-be-verified identity information of the target user, and determine a public key of the target user according to the public key certificate.

The signature verification unit 233 is configured to perform, based on the public key of the target user and the random challenge information, signature verification on the to-be-verified signature information to obtain the signature verification result.

For an exemplary implementation of the receiving unit 231, the public key obtaining unit 232 and the signature verification unit 233, reference may be made to the description about step S203 in the embodiment corresponding to FIG. 6. Details are not described herein again.

Referring to FIG. 12, the signature verification unit 233 may include a digest obtaining subunit 2331 and a signature verification processing subunit 2332.

The digest obtaining subunit 2331 is configured to decrypt, based on the public key of the target user, the to-be-verified signature information to obtain a digital digest.

The digest obtaining subunit 2331 is further configured to perform a hash operation on the random challenge information to obtain a real digital digest of the random challenge information.

The signature verification processing subunit 2332 is configured to determine that the signature verification result is a signature verification success result in response to the digital digest being the same as the real digital digest.

The signature verification processing subunit 2332 is further configured to determine that the signature verification result is a signature verification failure result in response to the digital digest being different from the real digital digest, and issue identity verification failure prompt information to the security certification component.

The to-be-verified signature information is obtained by invoking a public and private key storage component through the security certification component and signing the random challenge information through a private key in the public and private key storage component. The public and private key storage component has a data-unreadable attribute.

The public and private key storage component is a hardware device for connection with a terminal device, or the public and private key storage component is a hardware device within the terminal device, or the public and private key storage component is a software system run on the terminal device.

For an exemplary implementation of the digest obtaining subunit 2331 and the signature verification processing subunit 2332, reference may be made to the description about step S203 in the embodiment corresponding to FIG. 6. Details are not described herein again.

Referring to FIG. 12, the access control apparatus 2 may further include a registration module 25, a certification module 26 and a certificate management module 27.

The registration module 25 is configured to receive a user registration request sent by the security certification component for the target user. The user registration request includes the public key and user identity information.

The certification module 26 is configured to send, to the terminal device, an initial identity certification request issued based on the user registration request.

The certification module 26 is further configured to receive an identity certification reply sent by the security certification component according to the initial identity certification request, and perform initial identity certification according to the identity certification reply to obtain an initial identity certification result.

The certificate management module 27 is configured to generate the public key certificate according to the public key and basic certificate information in response to the initial identity certification result being determined to be an initial identity certification success result.

The certificate management module 27 is further configured to bind the public key certificate with the user identity information, and store the public key certificate and the user identity information, bound together, into the user information management library.

The certificate management module 27 is further configured to issue the public key certificate to the security certification component, so that the terminal device stores the public key certificate to the public and private key storage component.

For an exemplary implementation of the registration module 25, the certification module 26 and the certificate management module 27, reference may be made to the description about step S301 to step S304 in the embodiment corresponding to FIG. 7. Details are not described herein again.

Figure 13:
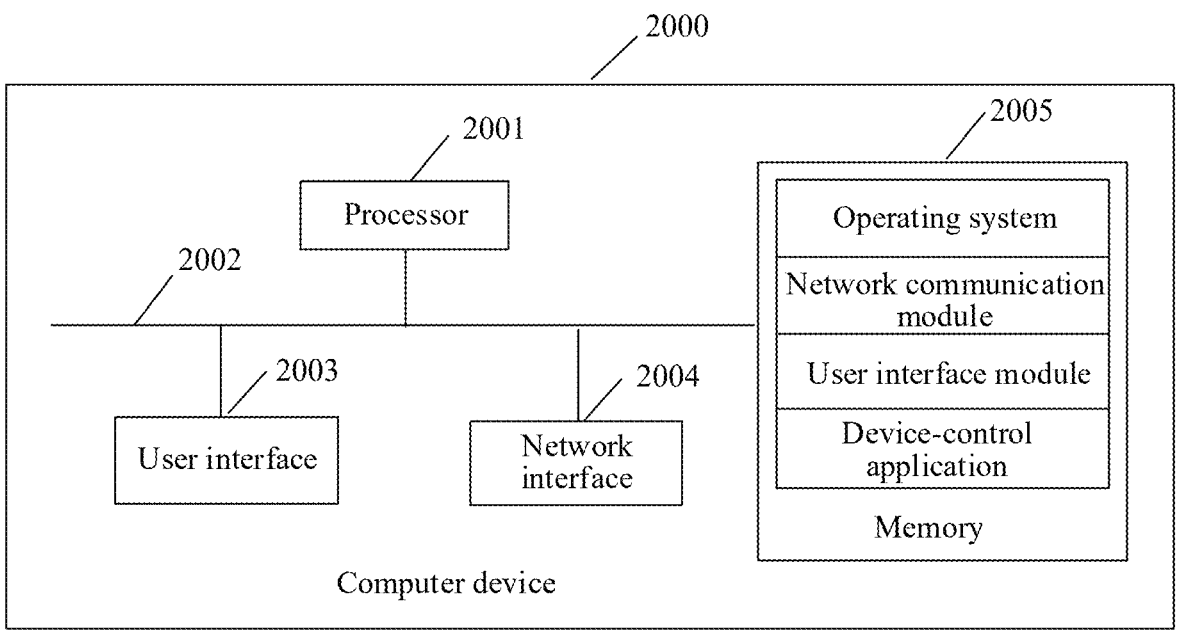
FIG. 13 is a schematic structural diagram of another computer device according to an embodiment of this disclosure.

Further, reference is made to FIG. 13. FIG. 13 is a schematic structural diagram of another computer device according to an embodiment of this disclosure. As shown in FIG. 13, the access control apparatus 2 in the embodiment corresponding to FIG. 12 may be applied to the computing device 2000. The computing device 2000 may include processing circuitry (such as a processor 2001), a network interface 2004 and a memory 2005. In addition, the computing device 2000 may further include a user interface 2003 and at least one communication bus 2002. The communication bus 2002 is configured to implement connection and communication between the components. The user interface 2003 may include a display, a keyboard. The user interface 2003 may further include a wired interface and a wireless interface. The network interface 2004 may include a wired interface and a wireless interface (such as a WI-FI interface). The memory 2005 may be a high-speed RAM, or a non-volatile memory, for example, at least one disk memory. The memory 2005 may be at least one storage apparatus that is located far away from the foregoing processor 2001. As shown in FIG. 13, the memory 2005 used as a computer-readable storage medium may include an operating system, a network communication module, a user interface module, and a device-control application.

In the computer device 2000 shown in FIG. 13, the network interface 2004 may be configured to provide a network communication function. The user interface 2003 is mainly configured to provide an input interface for a user. The processor 2001 may be configured to invoke the device-control application stored in the memory 2005, to implement the following operations:

performing, by a certification server in response to an identity certification request issued by a security certification component and carrying to-be-verified identity information of a target user, validity verification on the to-be-verified identity information;

sending random challenge information to the security certification component in a case that the to-be-verified identity information is determined to be valid information, so that the security certification component obtains to-be-verified signature information obtained by signing the random challenge information through a private key, the private key being unreadable;

receiving the to-be-verified signature information sent by the security certification component, and performing, based on the random challenge information and a public key certificate bound with the to-be-verified identity information, signature verification on the to-be-verified signature information to obtain a signature verification result;

issuing a signature verification success message to the security certification component in response to the signature verification result being a signature verification success result, so that the security certification component sends, based on the signature verification success message, a service access request to the certification server; and forwarding the service access request to the service server accessed by a service application.

It is to be understood that, the computer device 2000 described in this embodiment of this disclosure may implement the descriptions of the access control method in the foregoing embodiments, or the descriptions of the access control apparatus 2 in the embodiment corresponding to FIG. 12. Details are not described herein again. In addition, the descriptions of beneficial effects of the same method are not described herein again.

In addition, an embodiment of this disclosure further provides a computer-readable storage medium, such as a non-transitory computer-readable storage medium, and the computer-readable storage medium stores the computer program executed by the access control apparatus 2 mentioned above. When loading and executing the computer program, the processor may perform the descriptions of the access control method in any of the foregoing embodiments. Therefore, details are not described herein again. In addition, the descriptions of beneficial effects of the same method are not described herein again. For technical details that are not disclosed in the embodiments of the computer-readable storage medium involved in this disclosure, reference is made to the descriptions of the method embodiments of this disclosure.

The computer-readable storage medium may be the access control apparatus provided in any of the foregoing embodiments or an internal storage unit of the computer device, for example, a hard disk or an internal memory of the computer device. The computer-readable storage medium may also be an external storage device of the computer device, for example, a plug-in type hard disk, a smart media card (SMC), a secure digital (SD) card, or a flash card equipped on the computer device. Further, alternatively, the computer-readable storage medium may also include both an internal storage unit and an external storage device of the computer device. The computer-readable storage medium is configured to store the computer program and another program and data that are required by the computer device. The computer-readable storage medium may further be configured to temporarily store data that has been outputted or data to be outputted.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

What is disclosed above is merely exemplary embodiments of this disclosure which are not intended to limit the scope of this disclosure. Other embodiments shall fall within the scope of this disclosure.

What is claimed is:

1. An access control method of a user device, comprising:

receiving a service access request of a service application, the service access request including identity information of a user;

sending an identity validation request to a user management server based on the service access request, the identity validation request including the identity information of the user;

receiving challenge information from a certificate authority server based on the identity information of the user in the identity validation request being determined to be valid by the user management server, wherein the challenge information is based on a random value and associated with the identity information of the user;

forwarding, by processing circuitry, the challenge information to a key storage component of the user device, the key storage component being configured to generate a public key and a private key;

receiving, by the processing circuitry, signature information of the challenge information from the key storage component, the signature information of the challenge information being generated with the private key;

sending the signature information to the certificate authority server;

receiving a signature valid message from the certificate authority server when the challenge information is verified by the certificate authority server based on the public key that is indicated by a public key certificate from the user management server and associated with the identity information of the user; and sending, based on the signature valid message, the service access request to the user management server.

2. The access control method according to claim 1, wherein the signature information is generated by the key storage component, and the private key is inaccessible outside the key storage component.

3. The access control method according to claim 1, wherein the key storage component is configured to perform a hash operation on the challenge information to obtain a digital digest of the challenge information, and perform asymmetric encryption processing on the digital digest based on the private key to generate the signature information of the challenge information.

4. The access control method according to claim 1, wherein the key storage component is a hardware device.

5. The access control method according to claim 1, wherein the identity information of the user in the identity validation request is determined to be valid based on the identity information being included in valid user information.

6. The access control method according to claim 1, further comprising:

receiving, by the processing circuitry, the public key from the key storage component; and sending, by the processing circuitry, a user registration request for the user to the user management server, the user registration request including the public key and user information of the user.

7. The access control method according to claim 1, further comprising:

determining an access state of the user; and sending the service access request to the user management server based on the access state being an allowed access state, wherein the identity validation request is sent to the user management server based on the access state being an unknown access state.

8. A non-transitory computer-readable storage medium, storing instructions which when executed by a processor cause the processor to perform the access control method according to claim 1.

9. An access control method of a certificate authority server, comprising:

receiving, from a user management server, a challenge request corresponding to validated identity information of a user, the identity information being provided to the user management server in a service access request from a user device;

sending challenge information to a key storage component of the user device, the key storage component being configured to generate a public key and a private key, wherein the challenge information is based on a random value and associated with the identity information of the user;

receiving, from the key storage component of the user device, signature information of the challenge information, the signature information of the challenge information being generated with the private key;

sending a user information query request to the user management server;

receiving a public key certificate associated with the identity information of the user from the user management server based on the user information query request;

determining, by processing circuitry, whether the signature information is verified based on the public key that is indicated by the public key certificate; and sending a signature valid message to the user device based on the signature information being verified, the signature valid message indicating that the service access request is to be transmitted to the user management server.

10. The access control method according to claim 9, wherein the determining whether the signature information is verified comprises:

decrypting, based on the public key of the user, the signature information to obtain a digital digest;

performing a hash operation on the challenge information to obtain a real digital digest of the challenge information; and determining the signature information is verified based on the digital digest being same as the real digital digest.

11. The access control method according to claim 9, wherein the private key is inaccessible outside the key storage component.

12. The access control method according to claim 9, wherein the key storage component is a hardware device.

13. The access control method according to claim 9, further comprising:

receiving a certificate signing request from the user management server, the certificate signing request including the public key;

generating the public key certificate based on the certificate signing request; and sending the public key certificate to the user management server.

14. A non-transitory computer-readable storage medium, storing instructions which when executed by a processor cause the processor to perform the access control method according to claim 9.

15. An access control apparatus, comprising:

processing circuitry configured to:

receive a service access request of a service application, the service access request including identity information of a user;

send an identity validation request to a user management server based on the service access request, the identity validation request including the identity information of the user;

receive challenge information from a certificate authority server based on the identity information of the user in the identity validation request being determined to be valid by the user management server, wherein the challenge information is based on a random value and associated with the identity information of the user;

forward the challenge information to a key storage component of the access control apparatus, the key storage component being configured to generate a public key and a private key;

receive signature information of the challenge information from the key storage component, the signature information of the challenge information being generated with the private key;

send the signature information to the certificate authority server;

receive a signature valid message from the certificate authority server when the challenge information is verified by the certificate authority server based on the public key that is indicated by a public key certificate from the user management server and associated with the identity information of the user; and send, based on the signature valid message, the service access request to the user management server.

16. The access control apparatus according to claim 15, wherein the signature information is generated by the key storage component, and the private key is inaccessible outside the key storage component.

17. The access control apparatus according to claim 15, wherein the key storage component is configured to perform a hash operation on the challenge information to obtain a digital digest of the challenge information, and perform asymmetric encryption processing on the digital digest based on the private key to generate the signature information of the challenge information.

18. The access control apparatus according to claim 15, wherein the identity information of the user in the identity validation request is determined to be valid based on the identity information being included in valid user information.

19. The access control apparatus according to claim 15, wherein the processing circuitry is configured to:

receive the public key from the key storage component; and send a user registration request for the user to the user management server, the user registration request including the public key and user information of the user.

20. The access control apparatus according to claim 15, wherein the processing circuitry is configured to:

determine an access state of the user, and send the service access request to the user management server based on the access state being an allowed access state, wherein the identity validation request is sent to the user management server based on the access state being an unknown access state.

\* \* \* \* \*